(12) United States Patent
Futaki

(10) Patent No.: US 11,997,720 B2
(45) Date of Patent: May 28, 2024

(54) RADIO TERMINAL, RADIO ACCESS NETWORK NODE, AND METHOD THEREFOR

(71) Applicant: NEC Corporation, Tokyo (JP)

(72) Inventor: Hisashi Futaki, Tokyo (JP)

(73) Assignee: NEC CORPORATION, Tokyo (JP)

(*) Notice: Subject to any disclaimer, the term of this patent is extended or adjusted under 35 U.S.C. 154(b) by 429 days.

(21) Appl. No.: 17/284,904

(22) PCT Filed: Aug. 20, 2019

(86) PCT No.: PCT/JP2019/032470
§ 371 (c)(1),
(2) Date: Apr. 13, 2021

(87) PCT Pub. No.: WO2020/084878
PCT Pub. Date: Apr. 30, 2020

(65) Prior Publication Data
US 2021/0385867 A1    Dec. 9, 2021

(30) Foreign Application Priority Data

Oct. 26, 2018  (JP) ................................. 2018-202276

(51) Int. Cl.
*H04W 74/0833* (2024.01)
(52) U.S. Cl.
CPC ............................... *H04W 74/0833* (2013.01)
(58) Field of Classification Search
CPC ............. H04W 74/0833; H04W 72/23; H04W 74/002
See application file for complete search history.

(56) References Cited

U.S. PATENT DOCUMENTS

| 10,855,359 B2 * | 12/2020 | Zhou ...................... H04B 17/17 |
| 11,277,301 B2 * | 3/2022 | Zhou ...................... H04W 72/23 |
| 11,388,755 B2 * | 7/2022 | Cirik ...................... H04W 80/02 |

(Continued)

FOREIGN PATENT DOCUMENTS

| CN | 103931263 A | 7/2014 |
| CN | 108282899 A | 7/2018 |

(Continued)

OTHER PUBLICATIONS

International Search Report of PCT Application No. PCT/JP2019/032470 dated Nov. 5, 2019.

(Continued)

*Primary Examiner* — Julio R Perez

(57) ABSTRACT

A radio terminal (2) attempts to receive a second message of a 2-step random access procedure after transmitting a first message of the 2-step random access procedure. In response to successfully receiving the second message of the 2-step random access procedure and determining that the second message explicitly or implicitly indicates a fallback to a 4-step random access procedure, the radio terminal (2) further attempts to receive a control message that contains an uplink grant indicating uplink resources available for transmission of a third message of a 4-step random access procedure. This contributes to, for example, reducing the load on a radio terminal that supports a fallback from the 2-step random access procedure to the 4-step random access procedure.

22 Claims, 18 Drawing Sheets

(56) References Cited

U.S. PATENT DOCUMENTS

| | | | |
|---|---|---|---|
| 2018/0324653 A1* | 11/2018 | Nagaraja | H04W 36/0077 |
| 2019/0104554 A1* | 4/2019 | Amuru | H04W 74/0833 |
| 2020/0107372 A1* | 4/2020 | Agiwal | H04W 80/02 |
| 2020/0413485 A1* | 12/2020 | Kundu | H04W 80/02 |

FOREIGN PATENT DOCUMENTS

| | | |
|---|---|---|
| EP | 3858069 A1 | 8/2021 |
| KR | 10-2009-0109068 A | 10/2009 |
| WO | 2018/175809 A1 | 9/2018 |
| WO | 2020/034319 A1 | 2/2020 |

OTHER PUBLICATIONS

MediaTek Inc., "2-step CBRA procedure", 3GPP R2-1812342, 3GPP TSG-RAN WG2 Meeting #103, Aug. 20-24, 2018.

LG Electronics Inc., "Considerations on 2-Step CBRA procedure for NR-U SA", 3GPP R2-1812832, 3GPP TSG-RAN WG2 Meeting #103. Aug. 20-24, 2018, pp. 1-3, Gothenburg, Sweden.

Intel Corporation, "Considerations of 2-step CBRA for NR licensed and unlicensed operation", 3GPP R2-1811664, 3GPP TSG-RAN WG2 Meeting #103, Aug. 20-24, 2018, Gothenburg. Sweden.

LG Electronics Inc., "2-Step CBRA procedure for NR-U", 3GPP TSG RAN WG2 #103bis R2-1815157, Oct. 12, 2018, pp. 1-3, Chengdu, China.

InterDigital, "2-Step RACH Procedure", 3GPP TSG RAN WG2 # 103bis R2-1814008, Oct. 12, 2018, pp. 1-5, Chengdu, China.

Extended European Search Report for EP Application No. 19874960.8 dated Nov. 23, 2021.

Sony, "2-step RACH to 4-step RACH fallback", 3GPP TSG RAN WG2 NR Adhoc, 3GPP, R2-1700137, Jan. 17, 2017.

Japanese Office Communication for JP Application No. 2022-181312 dated Dec. 6, 2022 with English Translation.

Sony, "Considerations on initial access procedures for NR unlicensed operations", 3GPP TSG-RAN WG2 #103, 3GPP, R2-1811420, Aug. 24, 2018.

JP Office Action for JP Application No. 2022-069199, dated Mar. 7, 2023 with English Translation.

MediaTek Inc., "Further considerations on 2-step Rach", 3GPP TSG RAN WG2 #103bis, R2-1813965, Oct. 12, 2018, pp. 1-7.

Korean Office Action for KR Application No. 10-2021-7012106, dated Jan. 10, 2023 with English Translation.

Japanese Office Action for JP Application No. 2020-552549 dated Nov. 2, 2021 with English Translation.

ZTE Corporation, Sanechips, "Msg2 payload contents for 2-step RACH", 3GPP TSG RAN WG2 #103bis, 3GPP, Oct. 12, 2018, R2-1814034, China.

CATT, "Consideration on 2-step RA", 3GPP TSG RAN WG2 adhoc_2017_01_NR, 3GPP, Jan. 19, 2017, R2-1700205, USA.

CN Office Communication for CN Application No. 201980070770.4, mailed on Jan. 11, 2024 with English Translation.

* cited by examiner

RADIO TERMINAL, RADIO ACCESS NETWORK NODE, AND METHOD THEREFOR

This application is a National Stage Entry of PCT/JP2019/032470 filed on Aug. 20, 2019, which claims priority from Japanese Patent Application 2018-202276 filed on Oct. 26, 2018, the contents of all of which are incorporated herein by reference, in their entirety.

TECHNICAL FIELD

The present disclosure relates to a radio communication system and, in particular, to contention-based random access.

BACKGROUND ART

The 3rd Generation Partnership Project (3GPP) has been working on the standardization for the fifth generation mobile communication system (5G) to make 5G a commercial reality in 2020 or later. In this specification, the fifth generation mobile communication system is referred to as a 5G System or a Next Generation (NextGen) System (NG System). The new Radio Access Technology (RAT) for the 5G System is referred to as a New Radio (NR), a 5G RAT, or a NG RAT. A new Radio Access Network (RAN) for the 5G System is referred to as a NextGen RAN (NG RAN) or a 5G-RAN. A new base station (or an NG-RAN node) in the NG-RAN is referred to as a gNodeB or a gNB. A new core network for the 5G System is referred to as a 5G Core Network (5GC) or a NextGen Core (NG Core). A radio terminal (or a User Equipment (UE)) capable of being connected to the 5G System is referred to as 5G UE or NextGen UE (NG UE), or simply referred to as UE.

The main components of the 5GC includes an Access and Mobility Management function (AMF), a Session Management function (SMF), and a User plane function (UPF). The AMF performs, for example, connection and mobility managements for UEs and provides a termination of a control plane (CP) of the NG-RAN (e.g., exchange of CP information with NG-RAN nodes), and termination of a NAS layer (e.g., exchange of NAS messages with UEs). The SMF performs, for example, a session management (SM) and provides a termination of the session management part of NAS massages. The UPF is an anchor point of Intra-RAT and Inter-RAT mobility (e.g., handover) and performs, for example, a management of QoS flows (e.g., DL reflective QoS marking).

The term "LTE" used in this specification includes enhancement/evolution of LTE and LTE-Advanced to provide interworking with the 5G System, unless otherwise specified. The enhancement/evolution of LTE and LTE-Advanced for the interworking with the 5G System is referred to as LTE-Advanced Pro, LTE+, or enhanced LTE (eLTE). For example, an eLTE eNB functioning as a NG-RAN node is referred to as an ng-eNB. Further, terms related to LTE networks and logical entities used in this specification, such as "Evolved Packet Core (EPC)", "Mobility Management Entity (MME)", "Serving Gateway (S-GW)", and "Packet Data Network (PDN) Gateway (P-GW))", include their enhancement/evolution to provide interworking with the 5G System, unless otherwise specified. Enhanced EPC, enhanced MME, enhanced S-GW, and enhanced P-GW are referred to, for example, as enhanced EPC (eEPC), enhanced MME (eMME), enhanced S-GW (eS-GW), and enhanced P-GW (eP-GW), respectively.

Non-Patent Literature 1, 2, and 3 disclose a 2-step Contention Based Random Access (CBRA). As is well known, the CBRA in LTE uses a 4-step CBRA procedure. In 5G NR standardization, a 2-step CBRA procedure as well as the 4-step CBRA procedure has been discussed.

For example, in the 4-step CBRA for initial access from Radio Resource Control (RRC)_IDLE, a UE first transmits a first message (Msg1), or a random access preamble, on a Physical Random Access Channel (PRACH). Next, a network (i.e., gNB) transmits a second message (Msg2), or a random access response, using a Physical Downlink Control Channel (PDCCH) and a Physical Downlink Shared Channel (PDSCH). Specifically, the network transmits downlink control information (DCI) indicating PDSCH resources in which the Msg2 is scheduled and transmits the Msg2 on the PDSCH. The UE then transmits a third message (Msg3) on a Physical Uplink Shared Channel (PUSCH). In the case of initial access, the Msg3 contains a Medium Access Control Protocol Data Unit (MAC PDU) that carries Common Control Channel (CCCH) data (i.e., Service Data Unit (SDU)) of the RRC layer. The CCCH data (i.e., CCCH SDU) carries, for example, an RRC Setup Request. The MAC PDU (which contains the CCCH SDU) of the Msg3 at least contains a UE identifier (e.g., a Cell Radio Network Temporary Identifier (C-RNTI), a System Architecture Evolution (SAE) Temporary Mobile Subscriber Identity (S-TMSI), or a random value) to be used for contention resolution. Last, the network transmits a fourth message (Msg4) for contention resolution using the PDCCH and the PDSCH. Specifically, the network transmits DCI indicating PDSCH resources in which the Msg4 is scheduled and transmits the Msg4 on the PDSCH. The Msg4 contains a MAC PDU (or MAC subPDU) that carries a UE Contention Resolution Identity MAC Control Element (CE).

On the other hand, according to the basic principles of the 2-step CBRA, the UE transmits the first message (Msg1) and the third message (Msg3) of the 4-step CBRA together and the network (i.e., gNB) transmits the second message (Msg2) and the fourth message (Msg4) of the 4-step CBRA together. In other words, the first message of the 2-step CBRA (hereinafter referred to as Msg1*) corresponds to the first message (Msg1) and the third message (Msg3) in the 4-step CBRA and the second message in the 2-step CBRA (hereinafter referred to as Msg2*) corresponds to the second message (Msg2) and the fourth message (Msg4) of the 4-step CBRA. However, the contents of the Msg1* in the 2-step CBRA does not need to be completely the same as those of the Msg1 and the Msg3 in the 4-step CBRA. Likewise, the Msg2* in the 2-step CBRA does not need to have completely the same contents as the Msg2 and the Msg4 in the 4-step CBRA.

Further, a fallback from the 2-step CBRA to the 4-step CBRA has been discussed (see Non-Patent Literature 2 and 3). This fallback includes switching the 2-step CBRA procedure to the 4-step CBRA procedure in the middle of performing the 2-step CBRA procedure. Non-Patent Literature 2 discloses that, in a case where both Msg1 and Msg3 of the 4-step CBRA are transmitted in the first step of the 2-step CBRA procedure but the network successfully receives only the Msg1 of the 4-step CBRA, the network cannot transmit Msg4 of the 4-step CBRA, but it can transmit Msg2. Non-Patent Literature 2 further discloses that the UE may thus expect to receive a message corresponding to Msg2 of the 4-step CBRA or corresponding to Msg4 of the 4-step CBRA, after transmitting messages corresponding to Msg1 and Msg3 of the 4-step CBRA in the 2-step CBRA procedure. Put another way, Non-Patent Literature 2 discloses that the network and the UE fallback to the 4-step CBRA procedure if messages corresponding to Msg1 and Msg3 of the 4-step CBRA are transmitted in the first step of the 2-step CBRA procedure but only the message corresponding to the Msg1 of the 4-step CBRA is successfully received by the network.

Non-Patent Literature 3 discloses that it is possible that a gNB detects a preamble but not messages other than the preamble in the first message of the 2-step CBRA. Non-Patent Literature 3 further discloses that, in this case, the gNB transmits a Random Access Response (RAR) using the 4-step RA-RNTI calculation and the UE can fall back to the 4-step CBRA procedure upon receiving the RAR. As is well known, the RA-RNTI (i.e., Random Access Radio Network Temporary Identifier) addresses a PDSCH that carries Msg2 of the 4-step CBRA. Specifically, in the 4-step CBRA, the UE monitors the PDCCH using the RA-RNTI to decode a DCI indicating resources in which the PDSCH carrying the Msg2 is scheduled. The RA-RNTI is associated with the PRACH in which the Msg1 (i.e., random access preamble) is transmitted and is calculated based on the index of time-frequency slot in which the Msg1 is transmitted.

CITATION LIST

Non Patent Literature

Non Patent Literature 1: MediaTek Inc., "2-step CBRA procedure", 3GPP R2-1812342, 3GPP TSG-RAN WG2 Meeting #103, Gothenburg, Sweden, 20-24 Aug. 2018

Non Patent Literature 2: LG Electronics Inc., "Considerations on 2-Step CBRA procedure for NR-U SA", 3GPP R2-1812832, 3GPP TSG-RAN WG2 Meeting #103, Gothenburg, Sweden, 20-24 Aug. 2018

Non Patent Literature 3: Intel Corporation, "Considerations of 2-step CBRA for NR licensed and unlicensed operation", 3GPP R2-1811664, 3GPP TSG-RAN WG2 Meeting #103, Gothenburg, Sweden, 20-24 Aug. 2018

SUMMARY OF INVENTION

Technical Problem

The inventor has studied a fallback from a 2-step CBRA to a 4-step CBRA and switching between the 2-step CBRA and the 4-step CBRA and found various problems. For example, Non-Patent Literature 2 does not specifically disclose how the UE receives Msg2 or Msg4 after transmitting a first message (Msg1*) of the 2-step CBRA, which corresponds for example to both Msg1 and Msg3 of the 4-step CBRA. Non-Patent Literature 3 also does not specifically disclose how the UE receives a RAR that contains a preamble that uses the 4-step RA-RNTI calculation after the UE transmits a first message (Msg1*) of the 2-step CBRA.

If the UE is required to receive the second message (Msg2) of the 4-step CBRA in addition to the second message (Msg2*) of the 2-step CBRA, it may possible that the load in PDCCH/DCI blind decoding of the UE increases. In one example, after transmitting a first message of the 2-step CBRA, the UE needs to perform PDCCH/DCI blind decoding for receiving a second message (Msg2) of the 4-step CBRA regardless of whether it has succeeded in PDCCH/DCI blind decoding for receiving a second message (Msg2*) of the 2-step CBRA. These operations may increase the load on the UE, the complexity of the UE, or the battery consumption of the UE.

Further, an RAR window for receiving a second message (Msg2*) in the 2-step CBRA may be different from an RAR window for receiving a second message (Msg2) in the 4-step CBRA. If the RAR window of the 4-step CBRA expires after the RAR window of the 2-step CBRA expires, the time during which the UE needs to attempt to receive the RAR increases. Therefore, if the UE receive no RAR and restarts the random access from the first step, it may be possible that the beginning of the restart is delayed.

One of the objects to be attained by embodiments disclosed herein is to provide apparatuses, methods, and programs that contribute to reducing the load on a UE that supports a fallback from a 2-step CBRA to a 4-step CBRA. It should be noted that this object is merely one of the objects to be attained by the embodiments disclosed herein. Other objects or problems and novel features will be made apparent from the following description and the accompanying drawings.

Solution to Problem

In a first aspect, a radio terminal includes at least one memory and at least one processor coupled to the at least one memory. The at least one processor is configured to transmit a first message of a 2-step random access procedure and attempt to receive a second message of the 2-step random access procedure after transmitting the first message. The at least one processor is further configured to, in response to successfully receiving the second message of the 2-step random access procedure and determining that the second message explicitly or implicitly indicates a fallback to a 4-step random access procedure, attempt to receive a control message that contains an uplink grant indicating uplink resources available for transmission of a third message of a 4-step random access procedure.

In a second aspect, a radio access network node includes at least one memory and at least one processor coupled to the at least one memory. The at least one processor is configured to receive a first message of a 2-step random access procedure and transmit a second message of the 2-step random access procedure after receiving the first message. The second message explicitly or implicitly indicates a fallback to a 4-step random access procedure to request a radio terminal to, after successful reception of the second message, attempt to receive a control message that contains an uplink grant indicating uplink resources available for transmission of a third message of the 4-step random access procedure after successful reception of the second message.

In a third aspect, a method in a radio terminal includes the following steps:
  (a) transmitting a first message of a 2-step random access procedure;
  (b) attempting to receive a second message of the 2-step random access procedure after transmitting the first message; and
  (c) in response to successfully receiving the second message of the 2-step random access procedure and determining that the second message explicitly or implicitly indicates a fallback to a 4-step random access procedure, attempting to receive a control message that contains an uplink grant indicating uplink resources available for transmission of a third message of a 4-step random access procedure.

In a fourth aspect, a method in a radio access network node includes receiving a first message of a 2-step random access procedure; and transmitting a second message of the 2-step random access procedure after receiving the first message. The second message explicitly or implicitly indicates a fallback to a 4-step random access procedure to request a radio terminal to, after successful reception of the second message, attempt to receive a control message that contains an uplink grant indicating uplink resources available for transmission of a third message of the 4-step random access procedure.

In a fifth aspect, a program includes instructions (software codes) that, when loaded into a computer, cause the computer to perform the method according to the above-described third or fourth aspect.

Advantageous Effects of Invention

According to the above-deceived aspects, it is possible to provide apparatuses, methods, and programs that contribute to reducing the load on a UE that supports a fallback from a 2-step CBRA to a 4-step CBRA.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

Each of the embodiments described below may be used individually, or two or more of the embodiments may be appropriately combined with one another. These embodiments include novel features different from each other. Accordingly, these embodiments contribute to attaining objects or solving problems different from one another and also contribute to obtaining advantages different from one another.

The following descriptions on the embodiments mainly focus on the 3GPP 5G systems. However, these embodiments may be applied to other radio communication systems.

First Embodiment

Figure 1:
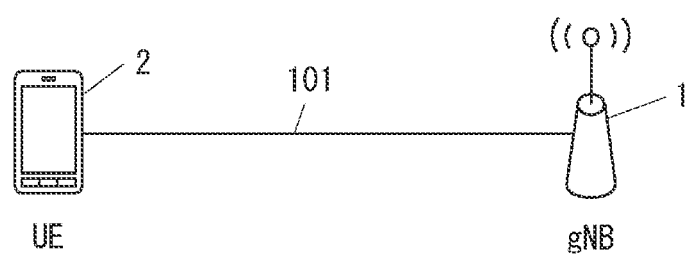
FIG. 1 is a diagram showing a configuration example of a radio communication network according to embodiments.

FIG. 1 shows a configuration example of a radio communication network according to embodiments including this embodiment. In the example shown in FIG. 1, the radio communication network includes a Radio Access Network (RAN) node (i.e., gNB) 1 and a radio terminal (i.e., UE) 2. The gNB 1 is deployed in a RAN (i.e., NG-RAN). The gNB 1 may either be a gNB Central Unit (gNB-CU) or a gNB Distributed Unit (gNB-DU) in the cloud RAN (C-RAN) deployment. The UE 2 is connected to the gNB 1 through an air interface 101. The UE 2 may be simultaneously connected to a plurality of base stations (i.e., Master gNB (MgNB) and Secondary gNB (SgNB) or Master Node (MN) and Secondary Node (SN)) for dual connectivity.

Figure 2:
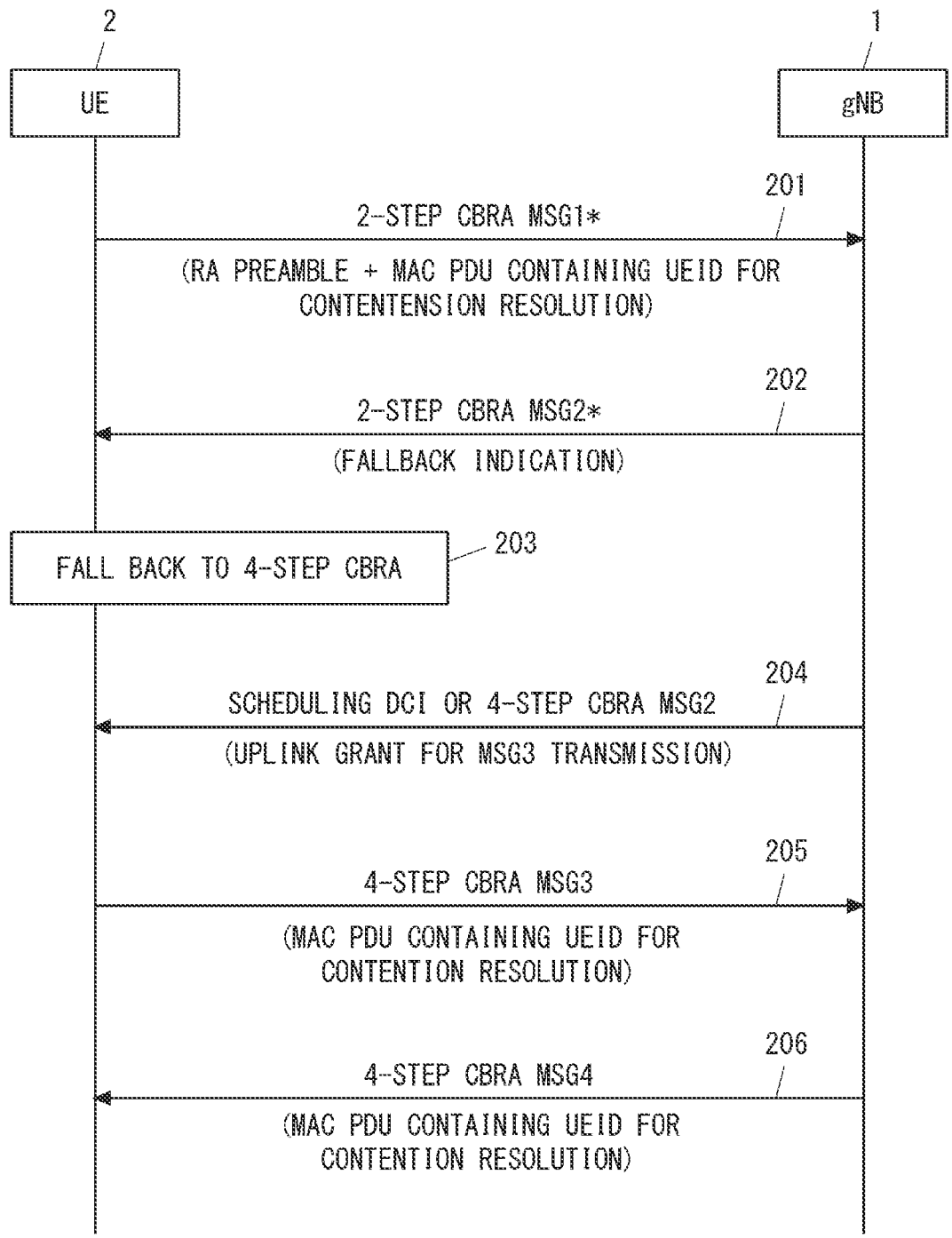
FIG. 2 is a sequence diagram showing a successful case of a CBRA procedure according to a first embodiment.

FIG. 2 shows one example of a CBRA procedure according to this embodiment. More specifically, FIG. 2 shows an example of a success case that involves a fallback from a 2-step CBRA to a 4-step CBRA procedure. In Step 201, the UE 2 transmits a first message (Msg1*) of the 2-step CBRA procedure. The Msg1* may carry, for example, a preamble and a MAC PDU. The preamble contained in the Msg1* may also be referred to as a random access (RA) preamble, a random access channel (RACH) preamble, or the like. The MAC PDU may contain, for example, CCCH data (i.e., a CCCH SDU). The CCCH data (or CCCH SDU) carries, for example, an RRC Setup Request, an RRC Re-establishment Request, or an RRC Resume Request. Additionally or alternatively, the MAC PDU may contain a terminal identifier (e.g., a C-RNTI, an S-TMSI, or a random value) used for contention resolution. This terminal identifier may be contained in MAC control information (or Control Element (CE)) within the MAC PDU. The MAC PDU may further or alternatively contain another MAC-layer control information that is defined for the 2-step CBRA.

In Step 202, the gNB 1 transmits a second message (Msg2*) of the 2-step CBRA procedure. In response to receiving the Msg1*, the gNB 1 determines whether or not the whole Msg1* has been successfully received. For example, if the preamble within the Msg1* (i.e., the information corresponding to the Msg1 of the 4-step CBRA) is successfully received but the MAC PDU within the Msg1* is not received, then the gNB 1 may include a notification of fallback in the second message (Msg2*) of the 2-step CBRA. The fallback notification explicitly or implicitly indicates a fallback to the 4-step CBRA procedure.

The Msg2* may contain a MAC control information (or CE) that is defined as a random access response (RAR) of the 2-step CBRA and is different from an RAR of the 4-step CBRA. Alternatively, the Msg2* may contain another information element (or field) that indicates a random access response (RAR) of the 2-step CBRA. The Msg2* may further contain an information element (e.g., a Timing Advance Command) regarding an uplink transmission timing associated with the successfully received preamble and contain a terminal identifier (e.g., a Temporary C-RNTI), regardless of whether the MAC PDU in the Msg1* has been successfully received. In other words, the gNB 1 may transmit an Msg2* (i.e., downlink MAC subPDU) that contains a Timing Advance Command destined for a target (i.e., UE) to which a fallback notification is sent, and also transmit an Msg2* (i.e., downlink MAC subPDU) that contains another Timing Advance Command destined for another target (i.e., UE) to which information necessary to complete the 2-step CBRA (e.g., an RRC message, or an UE Contention Resolution Identity MAC CE, or both) is sent. These two types of Msg2* may be contained in one downlink MAC PDU or in different downlink MAC PDUs transmitted in different radio resources (e.g., time or frequency). The successfully receiving the preamble within the Msg1* may be equivalent of correctly detecting this preamble or successfully decoding this preamble part. The fallback notification may be a notification indicating that only the preamble in the Msg1* has been successfully received. In the following, descriptions will be given using the term "fallback notification" (or "notification of a fallback").

When the UE has successfully received the second message (Msg2*) of the 2-step CBRA, the UE determines whether or not the Msg2* (explicitly or implicitly) indicates a fallback to the 4-step CBRA procedure. In response to determining that the Msg2* indicates a fallback to the 4-step CBRA procedure, the UE 2 falls back to the 4-step CBRA procedure (Step 203). Then the UE 2 starts an operation to transmit a third message (Msg3) of the 4-step CBRA procedure. That is, only if the UE 2 successfully decodes (or detects) the fallback notification from the Msg2*, the UE 2 expects the fallback to the 4-step CBRA procedure. In other words, the UE 2 does not need to expect or prepare the fallback to the 4-step CBRA procedure unless the UE 2 has successfully decoded (or has detected) the fallback notification from the Msg2*.

In response to determining that the Msg2* in Step 202 explicitly or implicitly indicates the fallback to the 4-step CBRA, the UE 2 executes Steps 204-206. In Step 204, in response to receiving the fallback notification in Step 202, the UE 2 attempts to receive a control message that contains an uplink grant indicating uplink resources (i.e., PUSCH resources) available for transmitting the third message (Msg3) of the 4-step CBRA procedure.

In some implementations, the above control message may be downlink control information that is transmitted via a PDCCH and contains an uplink grant (i.e., uplink scheduling DCI). In this case, this scheduling DCI may be addressed to a Temporary C-RNTI (i.e., scrambled with the Temporary C-RNTI) and the UE 2 may monitor the PDCCH using the Temporary C-RNTI in order to decode the scheduling DCI. This Temporary C-RNTI may be associated with the RA preamble detected by the gNB 1 and contained in the Msg2* in Step 202. That is, the UE 2 may use the Temporary C-RNTI associated with the preamble that the UE 2 has transmitted. This Temporary C-RNTI may be contained in the Msg2* in Step 202 as, for example, a MAC CE.

In some other implementations, the above control message may be a second message (Msg2) of the 4-step CBRA, i.e., a random access response (RAR) message. In this case, the UE 2 may attempt to receive a PDCCH including downlink control information (i.e., downlink scheduling DCI) that indicates downlink resources (i.e., PDSCH resources) in which the random access response message is scheduled, by using an RA-RNTI, and then receive the Msg2 (i.e., the random access response message) in response to successfully receiving the downlink control information. The value of this RA-RNTI may be different from that of the RA-RNTI used to receive the second message (Msg2*) of the 2-step CBRA in Step 202.

For example, the RA-RNTI (for the 4-step CBRA) may be calculated using the same formula as the RA-RNTI for the 2-step CBRA. However, in this case, a value input to at least one variable of the calculation formula to calculate the RA-RNTI for the 4-step CBRA may be different from that used to calculate the RA-RNTI for the 2-step CBRA. The at least one variable of the calculation formula may be the index indicating the radio resources (e.g., time-frequency slot) of the first message (i.e., RA preamble). Specifically, in place of the index of the time-frequency slot that has actually been used for the transmission of the first message (Msg1*) of the 2-step CBRA, the index of time-frequency slot available at the same timing as the Msg1* or at a timing of the first message (Msg1) of the 4-step CBRA subsequent to (or immediately after) the timing of the Msg1* may be used. More specifically, this index may include a first (sub) index indicating the time slot and a second (sub) index indicating the frequency slot. In order to calculate the RA-RNTI for the 4-step CBRA, the UE 2 may use the first (sub) index indicating a time slot that is available for the Msg1 of the 4-step CBRA while using the second (sub) index indicating the frequency slot that has actually been used for the Msg1* transmission of the 2-step CBRA.

Alternatively, the RA-RNTI for the 4-step CBRA to be used for the reception of the second message (Msg2) of the 4-step CBRA may be calculated using a calculation formula different from that for the RA-RNTI for the 2-step CBRA. The calculations of the RA-RNTI are executed in the UE 2 and the gNB 1 based on the same rule. For example, it can be understood that the radio resources in which the UE 2 has transmitted the Msg1* are the radio resources in which the gNB 1 has received the Msg1*.

Steps 205 and 206 may be similar to the third and fourth steps of the well-known 4-step CBRA. Specifically, in Step 205, the UE 2 transmits a third message (Msg3) of the 4-step CBRA in the PUSCH resources indicated by the uplink grant received in Step 204. The Msg3 may carry a MAC PDU that contains a terminal identifier (e.g., a C-RNTI, an S-TMSI, or a random value) to be used for contention resolution. The MAC PDU may further contain CCCH data (or a CCCH SDU). The CCCH data (or CCCH SDU) carries, for example, a message such as an RRC Setup Request, an RRC Re-establishment Request, an RRC Resume Request, or the like. In Step 206, the gNB 1 transmits a fourth message (Msg4) for contention resolution using a PDCCH and a PDSCH. Specifically, the gNB 1 transmits, on the PDCCH, a DCI indicating PDSCH resources in which the Msg4 is scheduled and transmits the Msg4 on the PDSCH. The Msg4 contains a MAC PDU that carries a UE Contention Resolution Identity MAC Control Element (CE). The Msg4 may further contain a message such as RRC Setup, RRC Re-establishment, RRC Resume, or the like.

According to the above operations, the UE 2 needs to attempt to receive the control message (Step 204) for continuing the 4-step CBRA only if the second message (Msg2*) of the 2-step CBRA is successfully received and this Msg2* explicitly or implicitly indicates the fallback to the 4-step CBRA. In other words, the UE 2 does not need to expect or prepare the fallback to the 4-step CBRA procedure unless the UE 2 has successfully decoded (or has detected) the fallback notification from the Msg2*. Accordingly, this can contribute to reducing the load on the UE, the complexity of the UE, or the battery consumption of the UE.

Figure 3:
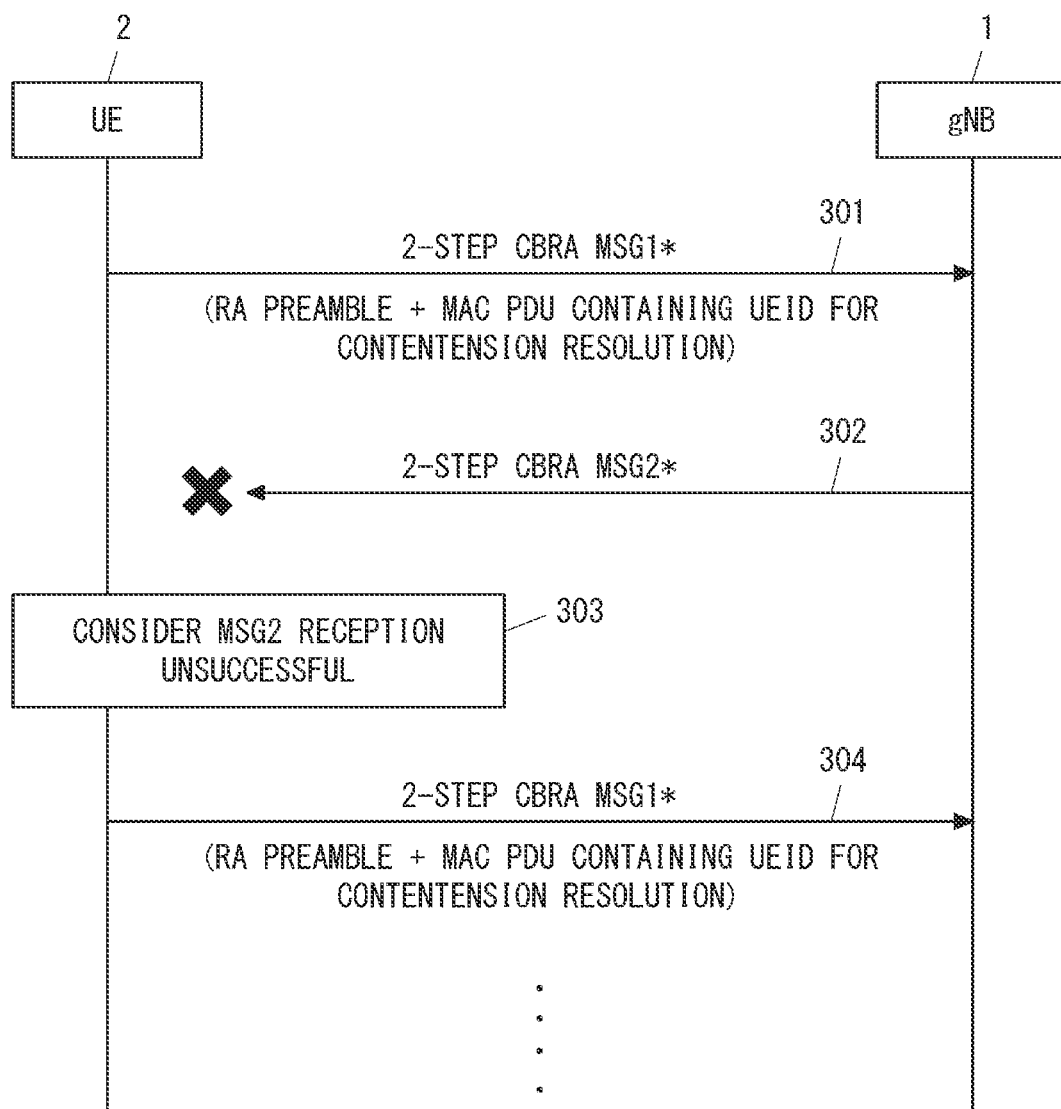
FIG. 3 is a sequence diagram showing a failure case of a CBRA procedure according to the first embodiment.

FIG. 3 shows another example of the CBRA procedure according to this embodiment. More specifically, FIG. 3 shows an example of a failure case of random access. The operations of the gNB 1 and the UE 2 in Steps 301 and 302 are similar to those in Steps 201 and 202 in FIG. 2. However, in the example shown in FIG. 3, the second message of the 2-step CBRA (Step 302) does not need to include a fallback notification. In other words, the second message of the 2-step CBRA (Step 302) does not need to indicate a fallback to the 4-step CBRA.

Further, in the example shown in FIG. 3, the UE 2 fails to receive the second message (Msg2*) of the 2-step CBRA. Specifically, if the RAR window has expired and if the UE 2 has not been received a second message that contains a preamble identifier that matches the index of the RA preamble transmitted in Step 301, the UE 2 considers that the second message has not been successfully received (Step 303). Then, in response to failing to receive the second message, the UE 2 restarts the 2-step CBRA procedure from transmission of the first message (Step 304) without attempting to receive the control message for the 4-step CBRA (Step 204). In other words, the second message (Msg2*) of the 2-step CBRA according to this embodiment requests (or causes) the UE 2 to, in response to failing to receive the second message, restart the 2-step CBRA procedure from transmission of the first message without attempting to receive the control message for the 4-step CBRA (Step 204).

According to the above operations, even when the UE 2 has failed to receive the second message (Msg2*) of the 2-step CBRA, the UE 2 does not need to expect or prepare the fallback to the 4-step CBRA procedure, and thereby the 2-step CBRA procedure may be restarted quickly.

Figure 4:
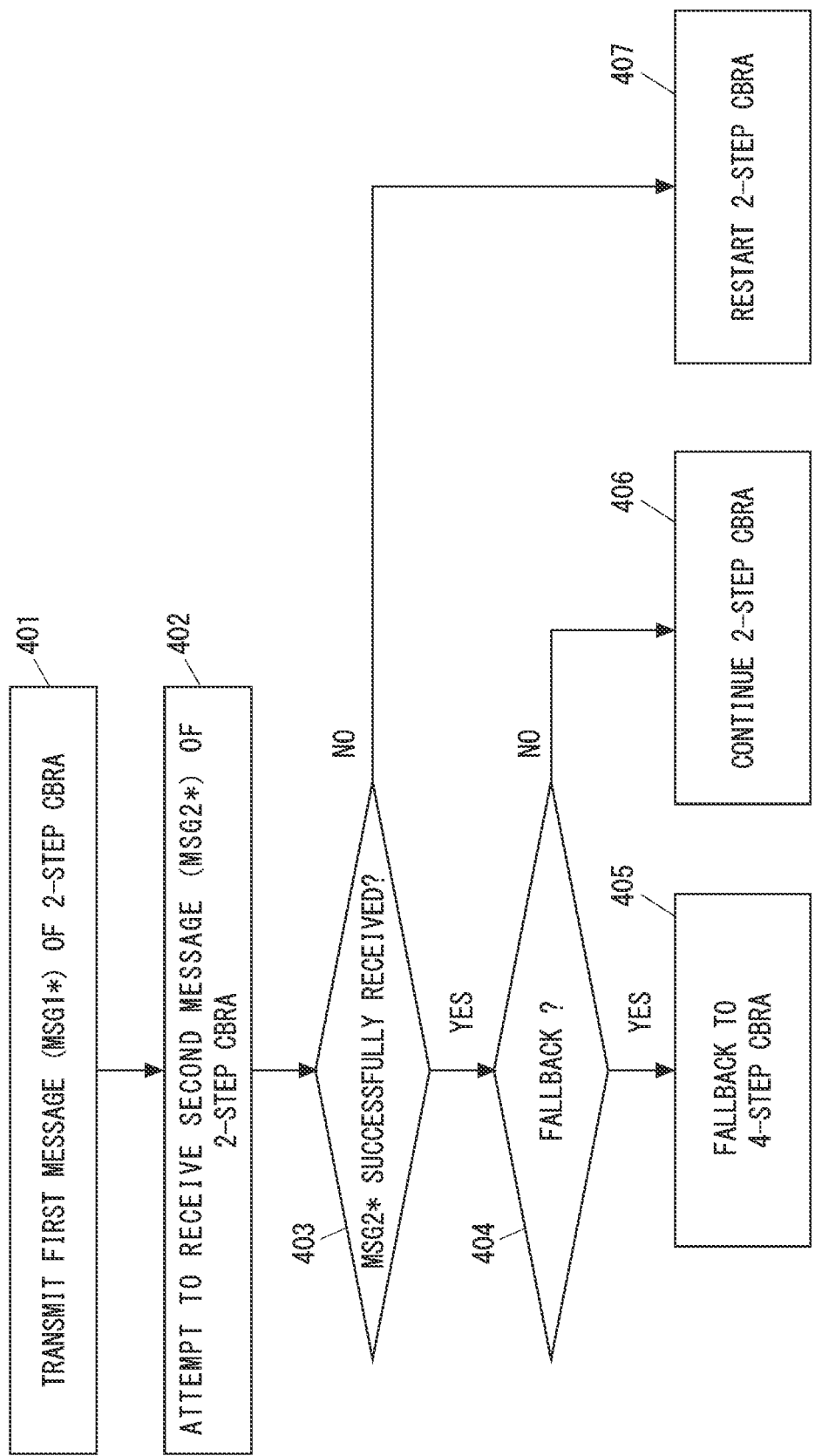
FIG. 4 is a flowchart showing an example of an operation of a radio terminal according to the first embodiment.

FIG. 4 is a flowchart showing one example of an operation of the UE 2 according to this embodiment. In Step 401, the UE 2 transmits a first message (Msg1*) of the 2-step CBRA. In Step 402, the UE 2 attempts to receive a second message (Msg2*) of the 2-step CBRA. In Step 403, the UE 2 determines whether or not it has successfully received the second message (Msg2*). Specifically, upon receiving in the RAR window a second message that contains the preamble identifier that matches the index of the RA preamble transmitted in Step 401, the UE 2 considers that the second message (Msg2*) has been successfully received (Step 403). That is, in this example, the successful reception of the second message (Msg2*) means that the UE 2 has determined that the RA preamble transmitted by the UE 2 itself has been successfully received (or detected). In Step 404, the UE 2 determines whether or not the second message (Msg2*) indicates a fallback.

If the second message (Msg2*) is successfully received and the second message (Msg2*) indicates a fallback, then the UE 2 falls back to the 4-step CBRA (Step 405). Specifically, the UE 2 may perform operations of Steps 204 and 205 in FIG. 2.

If the second message (Msg2*) is successfully received and the second message (Msg2*) does not indicate a fallback, the UE 2 continues the 2-step CBRA (Step 406). In other words, the UE 2 considers that the RA preamble transmitted by itself has been successfully received (or detected) (i.e., that the preamble transmission has been successfully completed) based on the contents of the second message (Msg2*) and further determines whether or not it has succeeded in the CBRA. Specifically, if the UE 2 determines successful completion of the contention resolution based on the successfully received second message (Msg2*), the UE 2 may consider that the 2-step CBRA procedure has been successfully completed.

If the second message (Msg2*) is not successfully received, the UE 2 restarts the 2-step CBRA procedure (Step 407). Specifically, the UE 2 may perform the operation of Step 304 in FIG. 3.

Figure 5:
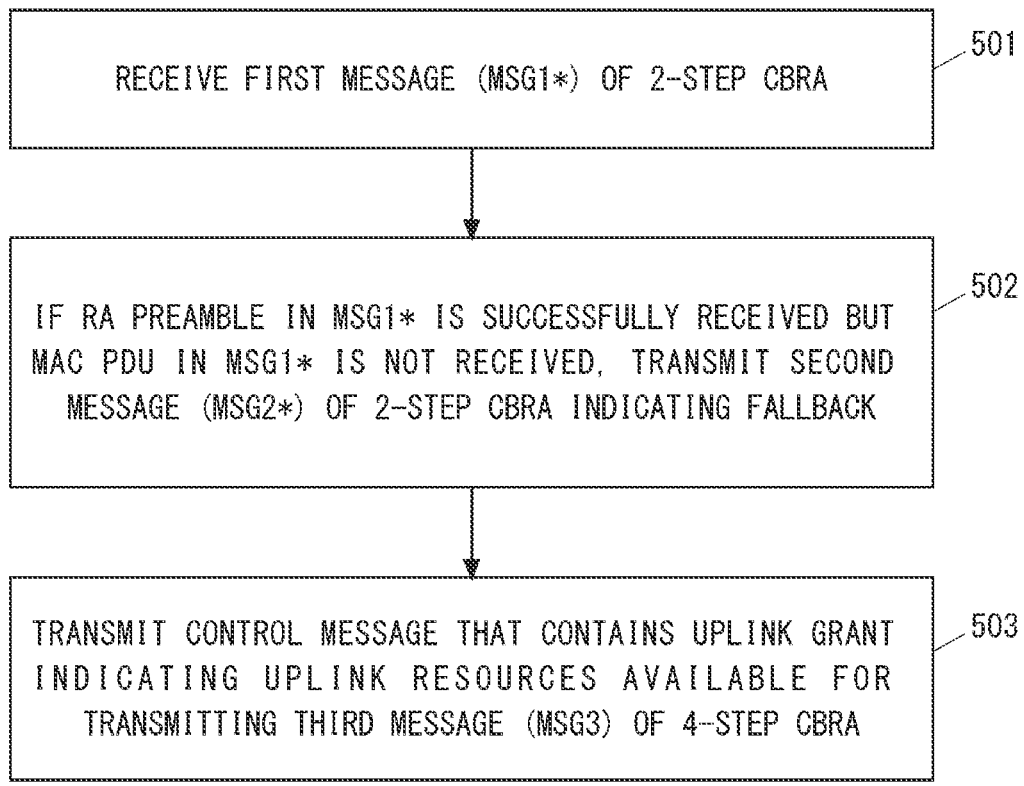
FIG. 5 is a flowchart showing an example of an operation of a radio access network node according to the first embodiment.

FIG. 5 is a flowchart showing one example of an operation of the gNB 1 according to this embodiment. In Step 501, the gNB 1 receives a first message (Msg1*) of the 2-step CBRA. In Step 502, if the RA preamble in the Msg1* is successfully received but the MAC PDU in the Msg1* (e.g., an RRC message including a UE identifier) is not successfully received, the gNB 1 transmits a second message (Msg2*) of the 2-step CBRA indicating a fallback. For example, the gNB 1 may include a fallback notification in the second message (Msg2*) of the 2-step CBRA. The second message (Msg2*) or the fallback notification requests (or causes) the UE 2 to, after successfully receiving this Msg2*, attempt to receive a control message that contains an uplink grant indicating uplink resources available for transmission of a third message (Msg3) of the 4-step CBRA.

In Step 503, the gNB 1 transmits the control message, which contains an uplink grant indicating uplink resources available for transmission of the third message (Msg3) of the 4-step CBRA.

The following provides specific examples of the fallback notification. The fallback notification may indicate a fallback to the 4-step CBRA explicitly or implicitly. In other words, the second message (Msg2*) of the 2-step CBRA may indicate a fallback to the 4-step CBRA explicitly or implicitly. The second message (Msg2*) of the 2-step CBRA may contain information that explicitly indicates a fallback to the 4-step CBRA or may contain information that implicitly indicates a fallback.

The fallback notification may indicate that only the preamble in the Msg1* has been received. The receiving preamble may be equivalent of detecting the preamble or correctly decoding the preamble.

Alternatively, the second message (Msg2*) of the 2-step CBRA may include a field indicating a flag bit that explicitly indicates whether or not a fallback should be performed. This field may be included in the MAC subheader of the MAC PDU or may be included in the MAC payload (or MAC SDU).

Alternatively, if a fallback to the 4-step CBRA is required, the second message (Msg2*) of the 2-step CBRA may include a MAC subheader associated with the fallback (e.g., a fall back MAC subheader). The format of the MAC subheader may be newly defined for an explicit fallback notification. The MAC subheader may include, for example, a field indicating that it is the (corresponding) MAC subheader, a Random Access Preamble Identifier (RAPID) field, and reserved bits.

Alternatively, lack of specific information in the second message (Msg2*) of the 2-step CBRA may imply a fallback. The information to be removed to imply the fallback may be information for contention resolution. This information may be, for example, a UE Contention Resolution Identity MAC CE. That is, if the preamble and the other information in the Msg1* (e.g., a MAC PDU) are successfully received, the gNB 1 includes the UE Contention Resolution Identity MAC CE associated with the received preamble in the Msg2* (i.e., a downlink MAC subPDU or a downlink MAC PDU). On the other hand, if only the preamble has been successfully received and thus the fallback to the 4-step CBRA is required, the gNB 1 does not include the UE Contention Resolution Identity MAC CE associated with the received preamble in the Msg2* (i.e., a downlink MAC subPDU or a downlink MAC PDU). Strictly speaking, since the gNB 1 has not successfully received the other information within the Msg1*, the gNB 1 cannot include the UE Contention Resolution Identity MAC CE in the Msg2*. If the gNB 1 does not fall back to the 4-step CBRA although it has successfully received only the preamble, the gNB 1 does not include even the index that corresponds to this preamble in the downlink MAC subPDU (or the downlink MAC PDU). In other words, if the gNB 1 does not fall back to the 4-step CBRA although it has successfully received only the preamble in the first message (Msg1*) of the 2-step CBRA, the gNB 1 does not transmit the second message (Msg2*) in response to the first message (Msg1*).

The second message (Msg2*) of the 2-step CBRA may include additional information such as one or both of the Temporary C-RNTI and the Timing Advance Command even when the second message (Msg2*) of the 2-step CBRA indicates a fallback to the 4-step CBRA.

Second Embodiment

A configuration example of a radio communication network according to this embodiment is similar to the example shown in FIG. 1. If the gNB 1 according to this embodiment does not successfully receive a first message (Msg1*) of the 2-step CBRA and thus falls back to the 4-step CBRA, the gNB 1 includes, in a second message (Msg2*) of the 2-step CBRA, a fallback notification and an uplink grant indicating uplink resources available for third message (Msg3) transmission of the 4-step CBRA. The fallback notification explicitly or implicitly indicates the fallback to the 4-step CBRA procedure. This may be performed by a method similar to that described in the first embodiment. For example, the fallback notification may indicate that only the preamble in the Msg1* has been detected (or received) in association with an identifier of the preamble (e.g., a flag bit with detected preamble index). The fallback notification may be a specific field or bit included in the MAC subheader of the downlink MAC PDU. That is, a state in which the specific field or bit is included in the Msg2* and a MAC subPDU corresponding thereto is included therein may indicate a notification of a fallback.

The Msg2* may be defined as a random access response (RAR) of the 2-step CBRA. A random access response (RAR) when Msg1* has been successfully received and another random access response when Msg1* has not been successfully received but only the preamble has been successfully received may be contained in one downlink MAC PDU, or they may be transmitted via different downlink MAC PDUs transmitted in different radio resources (e.g., time or frequency). The Msg2* may further contain an information element (e.g., a Timing Advance Command) regarding the uplink transmission timing associated with the successfully received preamble and contain a terminal identifier (e.g., a Temporary C-RNTI), regardless of whether the MAC PDU in the Msg1* has been successfully received.

Upon receiving the Msg2* of the 2-step CBRA that contains the fallback notification and the uplink grant, the UE 2 according to this embodiment transmits Msg3 of the 4-step CBRA in accordance with the uplink grant.

Third Embodiment

A configuration example of a radio communication network according to this embodiment is similar to the example shown in FIG. 1. The gNB 1 according to this embodiment is configured to transmit system information indicating activation of a fallback to the 4-step CBRA. The gNB 1 may broadcast the system information in such a way that the UE 2 in RRC_IDLE is able to receive this system information (e.g., in System Information Block Type 1 (SIB1)). This system information causes the UE 2 to, after transmitting a first message (Msg1*) of the 2-step CBRA, concurrently attempt both to receive a second message (Msg2*) of the 2-step CBRA and to receive a second message (Msg2) of the 4-step CBRA.

Upon receiving the system information from a network (i.e., the gNB 1), the UE 2 according to this embodiment attempts both to receive the second message (Msg2*) of the 2-step CBRA and to receive the second message (Msg2) of the 4-step CBRA after transmitting the first message (Msg1*) of the 2-step CBRA.

The attempt to receive the second message (Msg2*) of the 2-step CBRA may include attempting to receive the second message (Msg2*) of the 2-step CBRA in a first time window (e.g., an RAR window) associated with the 2-step CBRA. Likewise, the attempt to receive the second message (Msg2) of the 4-step CBRA may include attempting to receive the second message (Msg2) of the 4-step CBRA in a second time window (e.g., an RAR window) associated with the 4-step CBRA. In this case, the UE performs the reception of the Msg2* and the reception of the Msg2 concurrently (i.e., in parallel) in a certain time period. However, when the reception of the Msg2* and the reception of the Msg2 overlap each other at exactly the same timing (e.g., subframe, OFDM symbol, or TTI), the UE 2 may attempt to receive only one of them (e.g., the Msg2*).

More specifically, the attempt to receive the second message (Msg2*) of the 2-step CBRA may include monitoring a PDCCH in the first time window (e.g., the RAR window) using a first RA-RNTI associated with the 2-step CBRA, in order to decode a DCI indicating downlink resources in which the second message (Msg2*) of the 2-step CBRA is scheduled. Likewise, the attempt to receive the second message (Msg2) of the 4-step CBRA may include monitoring the PDCCH in the second time window (e.g., the RAR window) using a second RA-RNTI associated with the 4-step CBRA, in order to decode a DCI indicating downlink resources in which the second message (Msg2) of the 4-step CBRA is scheduled.

The first RA-RNTI is associated with the first message (Msg1*) of the 2-step CBRA transmitted by the UE and is calculated based on index of radio resources (e.g., time-frequency slot) in which the Msg1* is transmitted. On the other hand, the second RA-RNTI may be calculated based on at least part of the index of radio resources (e.g., time-frequency slot) allocated for the first message (Msg1) of the 4-step CBRA that is concurrently with or subsequent to (immediately after) the first message (Msg1*) of the 2-step CBRA transmitted by the UE. More specifically, this index may include a first (sub) index indicating the time slot and a second (sub) index indicating the frequency slot. In order to calculate the second RA-RNTI, the UE 2 may use the first (sub) index indicating the time slot that is available for the Msg1 of the 4-step CBRA while using the second (sub) index indicating the frequency slot that has actually been used for the Msg1* transmission of the 2-step CBRA. Alternatively, the second RA-RNTI may be calculated using a calculation formula different from that used to calculate the first RA-RNTI. The calculations of the RA-RNTI are executed in the UE 2 and the gNB 1 based on the same rule. For example, it can be understood that the radio resources in which the UE 2 has transmitted the Msg1* are the radio resources in which the gNB 1 has received the Msg1*.

Figure 6:
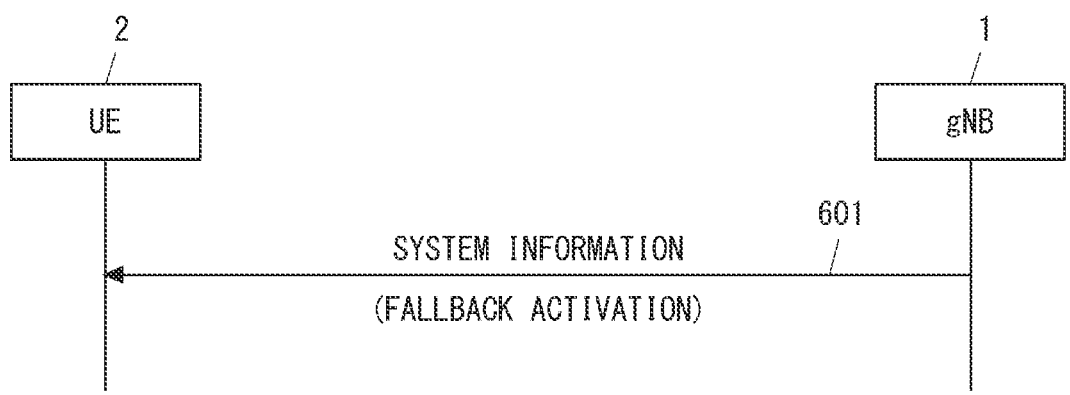
FIG. 6 is a sequence diagram showing an example of operations of a radio access network node and a radio terminal according to a third embodiment.

FIG. 6 shows one example of operations of the gNB 1 and the UE 2 according to this embodiment. In Step 601, the gNB 1 transmits system information indicating activation of a fallback to the 4-step CBRA.

Figure 7:
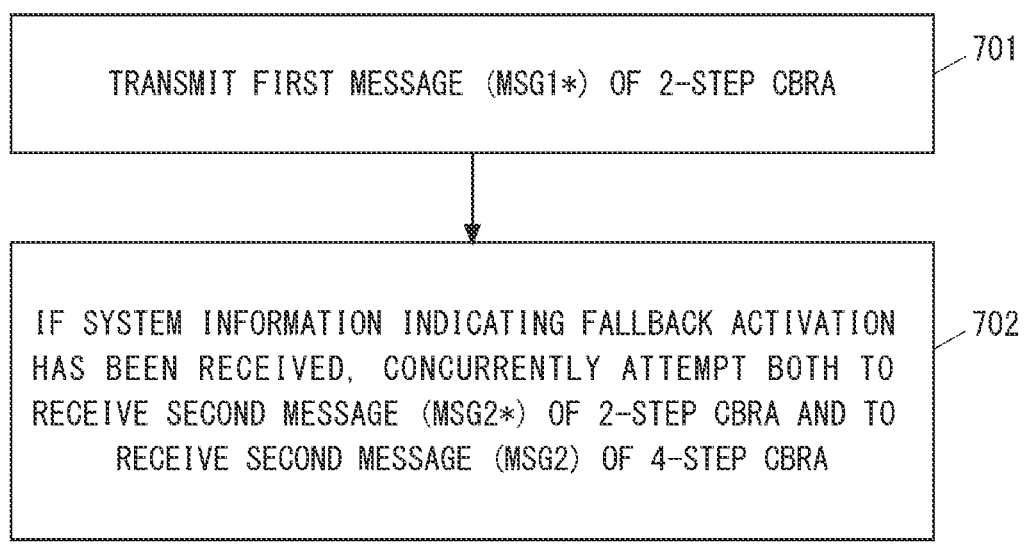
FIG. 7 is a flowchart showing an example of an operation of a radio terminal according to the third embodiment.

FIG. 7 is a flowchart showing one example of an operation of the UE 2 according to this embodiment. In Step 701, the UE 2 transmits a first message (Msg1*) of the 2-step CBRA. In Step 702, if the UE 2 has received system information indicating fallback activation, the UE 2 concurrently attempts both to receive a second message (Msg2*) of the 2-step CBRA and to receive a second message (Msg2) of the 4-step CBRA.

In place of the aforementioned system information, the gNB 1 may include information indicating activation of a fallback in the second message (Msg2*) of the 2-step CBRA. In this case, if the UE 2 receives the second message (Msg2*) of the 2-step CBRA, successfully decodes the Msg2*, and detects the information indicating activation of the fallback, then the UE 2 may attempt to receive the second message (Msg2) of the 4-step CBRA.

According to the above operations, the UE 2 needs to attempt to receive the second message (Msg2) of the 4-step CBRA only if the network has indicated fallback activation to the UE 2. Accordingly, this can contribute to reducing the load on the UE, the complexity of the UE, or the battery consumption of the UE.

Fourth Embodiment

Figure 8:
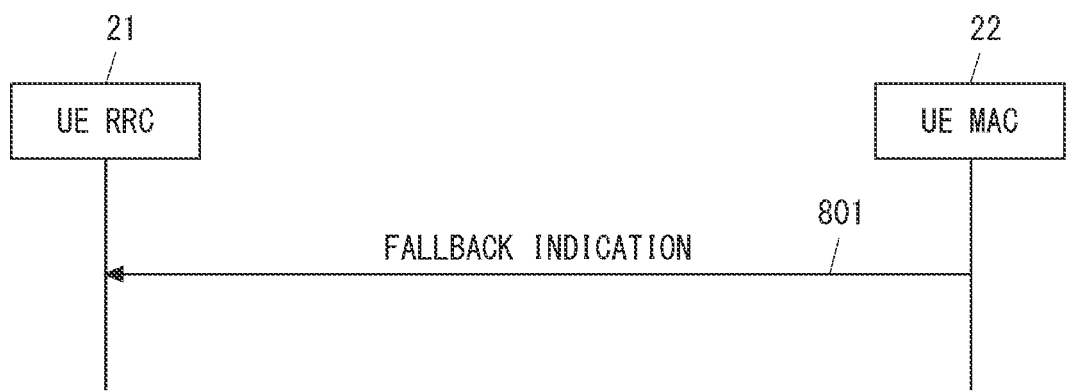
FIG. 8 is a sequence diagram showing an example of an operation of a radio terminal according to a fourth embodiment.

A configuration example of a radio communication network according to this embodiment is similar to the example shown in FIG. 1. The UE 2 according to this embodiment provides an RRC layer 21 and a MAC layer 22. The MAC layer 22 may also be referred to as a MAC sublayer or a MAC entity FIG. 8 shows one example of operations of the RRC layer 21 and the MAC layer 22. In Step 801, if the MAC layer 22 falls back from the 2-step CBRA to the 4-step CBRA, the MAC layer 22 notifies the RRC layer 21 of this fallback. The MAC layer 22 may send a fallback indication to the RRC layer 21. In response to receiving the fallback indication, the RRC layer 21 may generate an Msg3 content (e.g., CCCH SDU) adapted to the 4-step CBRA. Additionally or alternatively, in response to receiving the fallback indication, in order to update at least one of parameters for the random access procedure so as to make it adapted to the configuration of the 4-step CBRA (that is, in order to switch the 2-step configuration to the 4-step configuration), the RRC layer 21 may transmit this parameter to the MAC layer 22.

When the MAC layer 22 falls back from the 2-step CBRA to the 4-step CBRA, it may flush a transmission buffer (e.g., Tx buffer) that has stored contents to be transmitted in the Msg1* of the 2-step CBRA and store therein contents to be transmitted in the Msg3 of the 4-step CBRA. This transmission buffer may be similar to an existing Msg3 buffer for the 4-step CBRA. Alternatively, the UE 2 (or the MAC layer 22) may have a new Msg1 Buffer for the Msg1* of the 2-step CBRA and may use this Msg1 Buffer and the MSG3 Buffer for the Msg3 for the 4-step CBRA.

When the UE 2 falls back from the 2-step CBRA to the 4-step CBRA, it may continue or restart a specific timer (e.g., T3xy) associated with a procedure for triggering the CBRA. In order to restart the specific timer, the UE 2 (the RRC layer 21) may pause and reset the running specific timer and start it again from an initial value. This timer may be, for example, a timer (i.e., T300) used for an RRC Setup procedure for establishing an RRC connection, a timer (i.e., T301) used for an RRC Re-establishment procedure to re-establish an RRC connection, a timer (i.e., T319) used for an RRC Resume procedure to resume an RRC connection, or another timer of the RRC layer.

When the UE 2 (or the MAC layer 22) falls back from the 2-step CBRA to the 4-step CBRA is performed, it may continue or restart a counter that counts the number of RA preamble transmissions (i.e., a PREAMBLE_TRANSMISSION_COUNTER).

Figure 9:
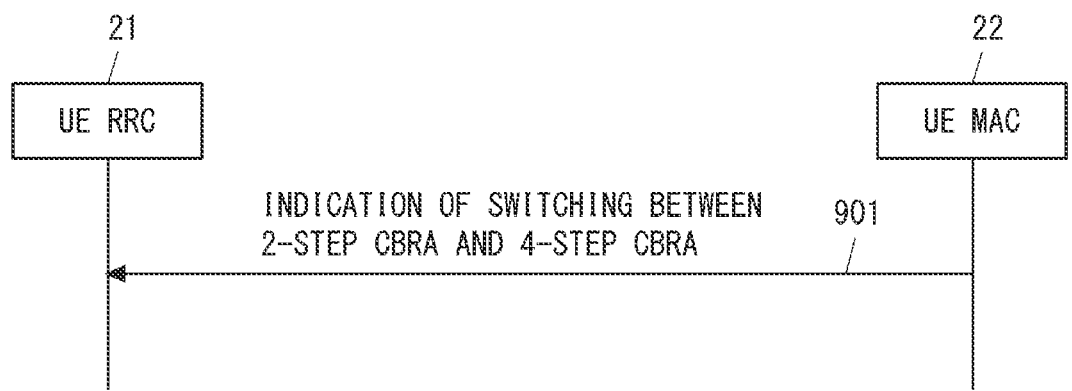
FIG. 9 is a sequence diagram showing an example of an operation of a radio terminal according to the fourth embodiment.

When the MAC layer 22 returns from the 4-step CBRA to the 2-step CBRA (i.e., when the MAC layer 22 ends the fallback), the MAC layer 22 may notify the RRC layer 21 of it. That is, as shown in FIG. 9, the MAC layer 22 may notify the RRC layer 21 of a change from the 2-step CBRA to the 4-step CBRA and vice versa (Step 901). Like in the case of the fallback from the 2-step CBRA to the 4-step CBRA described above (but in the opposite direction), the MAC layer 22 may control the transmission buffer, the timer, or the counter.

According to the above operations, the RRC layer 21 of the UE 2 can perform processing (e.g., the Msg1* contents generation, the Msg3 contents generation, or update of random-access-related parameters) adapted to the CBRA procedure selected by the MAC layer 22 (i.e., the 2-step CBRA or the 4-step CBRA).

Fifth Embodiment

A configuration example of a radio communication network according to this embodiment is similar to the example shown in FIG. 1. If a random access is not successfully completed although a fallback from the 2-step CBRA to the 4-step CBRA has been performed, the UE 2 according to this embodiment selects between the 2-step CBRA and the 4-step CBRA to restart the random access.

Figure 10:
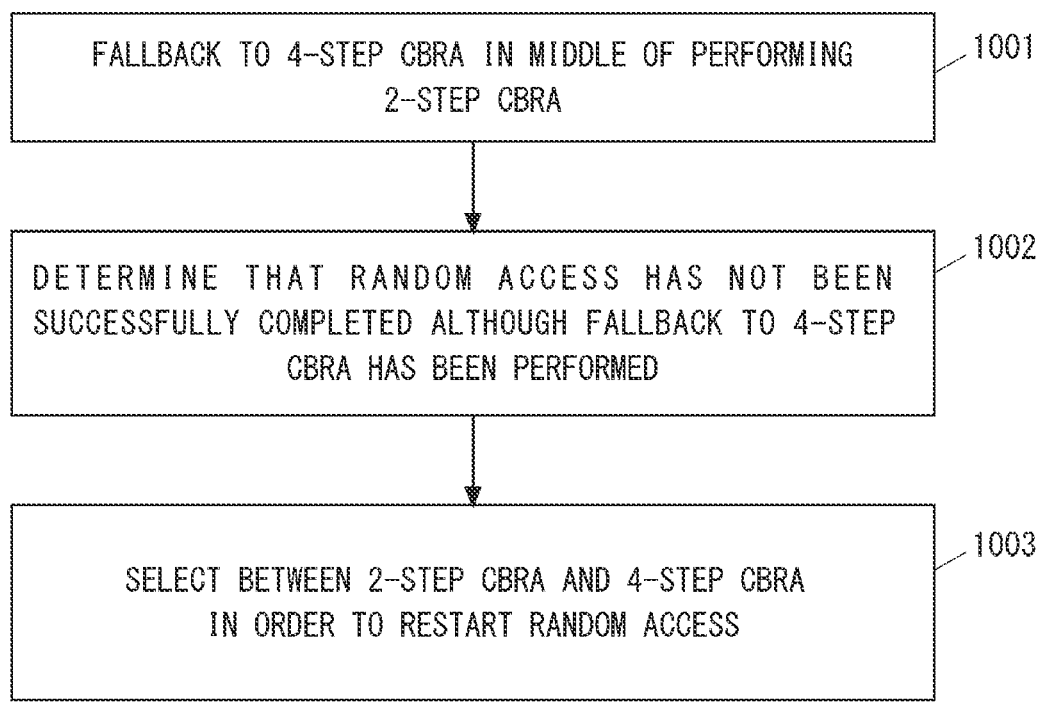
FIG. 10 is a sequence diagram showing an example of an operation of a radio terminal according to a fifth embodiment.

FIG. 10 is a flowchart showing one example of an operation of the UE 2 according to this embodiment. In Step 1001, the UE 2 falls back to the 4-step CBRA in the middle of performing the 2-step CBRA procedure. For example, but without any limitation intended, this fallback may be performed in a way similar to the procedure described in the first embodiment (e.g., FIG. 2) or the procedure described in the second embodiment. The fallback may be performed according to a procedure different from the procedures described in the first and second embodiments. For example, the UE 2 may start from the beginning of the 4-step CBRA, i.e., transmission of the first message (Msg1), when the UE 2 falls back to the 4-step CBRA in the middle of performing the 2-step CBRA procedure.

In Step 1002, the UE 2 determines that the random access has not been successfully completed even though the fallback to the 4-step CBRA has been performed. The UE 2 may consider that the random access has not been successfully completed in response to unsuccessful contention resolution. More specifically, the UE 2 may consider that the random access has not been successfully completed if the UE 2 has received a PDCCH (DCI) addressed to its Temporary C-RNTI and successfully decoded a MAC PDU of the fourth message (Msg4) but the UE Contention Resolution Identity MAC CE contained in the MAC PDU does not match the CCCH SDU (i.e., a UE identifier (e.g., an S-TMSI or a random value) transmitted in the third message (Msg3). Alternatively, the UE 2 may consider that the random access has not been successfully completed if the UE 2 fails in transmitting the third message (Msg3) or fails in receiving the fourth message (Msg4). Alternatively, the UE 2 may consider that the random access has not been successfully completed if the UE 2 has transmitted the third message (Msg3) including the C-RNTI but fails to successfully receive the PDCCH (or DCI) addressed to this C-RNTI.

In Step 1003, the UE 2 selects between the 2-step CBRA and the 4-step CBRA in order to restart the random access. In other words, the UE 2 selects (or determines) which one of the 2-step CBRA and the 4-step CBRA should be used in order to restart the random access.

In some implementations, the UE 2 may restart the random access according to one of the 2-step CBRA procedure and the 4-step CBRA procedure, in which the next available preamble transmission opportunity (i.e., PRACH occasion) comes earlier than in the other. This operation allows the UE 2 to promptly restart the random access.

Additionally or alternatively, the UE 2 may restart the random access according to one of the 2-step CBRA procedure and the 4-step CBRA procedure, in which a cycle or interval between available preamble transmission opportunities (i.e., PRACH occasions) is shorter than in the other. This operation allows the UE 2 to promptly restart the random access. In particular, this operation is effective when retransmission of the preamble is required.

Additionally or alternatively, the UE 2 may count the number of attempts (or preamble transmissions) of the 2-step CBRA and the number of attempts (or preamble transmissions) of the 4-step CBRA separately from each other. Specifically, the UE 2 may use, besides a PREAMBLE_TRANSMISSION_COUNTER to count the number of preamble transmissions of the 4-step CBRA, a PREAMBLE_TRANSMISSION_COUNTER to count the number of preamble transmissions of the 2-step CBRA. In this case, the UE 2 may select which one of the 2-step CBRA and the 4-step CBRA should be used in order to restart the random access, based on the values of these two counters. For example, the UE 2 may select a CBRA procedure associated with the counter having the smaller count value in order to restart the random access. Alternatively, the maximum value of the PREAMBLE_TRANSMISSION_COUNTER of the 2-step CBRA may be set to be smaller than the maximum value of the PREAMBLE_TRANSMISSION_COUNTER of the 4-step CBRA. In this case, the UE 2 may preferentially select the 2-step CBRA to restart the random access until the PREAMBLE_TRANSMISSION_COUNTER of the 2-step CBRA reaches its maximum value. The maximum values of these counters may be included in a system information block (e.g., SIB1) message described above, or described later, and then sent from the gNB 1 to the UE 2.

Sixth Embodiment

Figure 11:
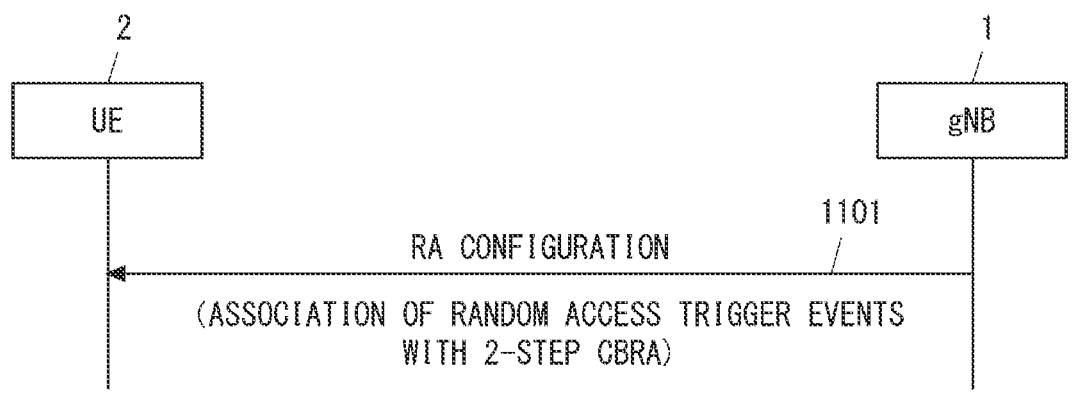
FIG. 11 is a sequence diagram showing an example of operations of a radio access network node and a radio terminal according to a sixth embodiment.

A configuration example of a radio communication network according to this embodiment is similar to the example shown in FIG. 1. FIG. 11 shows one example of operations of the gNB 1 and the UE 2 according to this embodiment. In Step 1101, the gNB 1 transmits to the UE 2 a configuration indicating that at least one of a plurality of events that trigger start of the random access is associated with the 2-step CBRA (or is allowed to use the 2-step CBRA or is specified to use the 2-step CBRA). This configuration may be common to a plurality of UEs and may be broadcast to a plurality of UEs. This configuration may be included and transmitted in a system information block message. Alternatively, the configuration may be created per UE and supplied to the UE 2 by dedicated signalling (e.g., RRC signalling).

Figure 12:
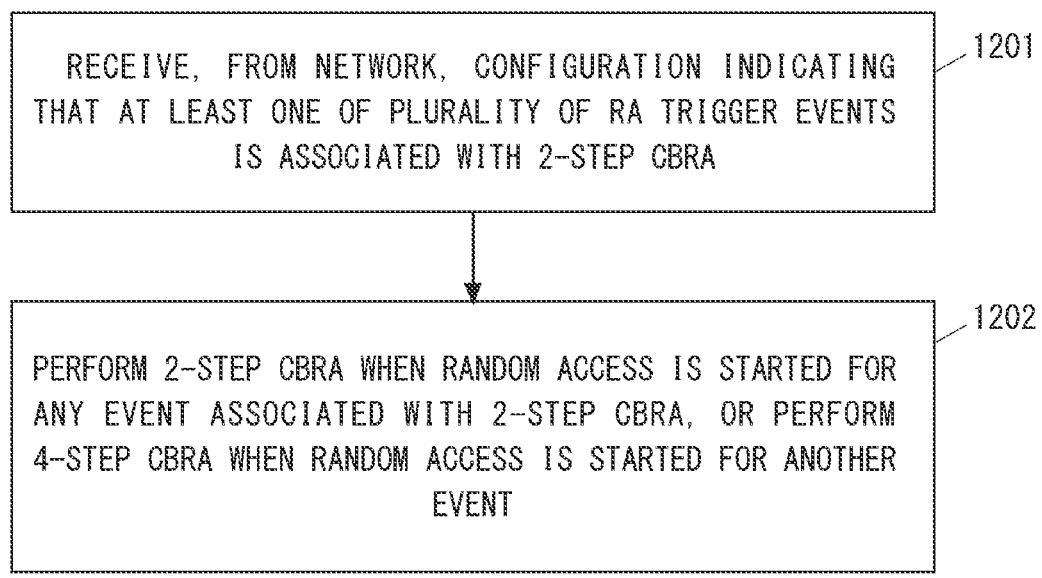
FIG. 12 is a sequence diagram showing an example of an operation of a radio terminal according to the sixth embodiment.

FIG. 12 is a flowchart showing one example of an operation of the UE 2 according to this embodiment. In Step 1201, the UE 2 receives from the network (e.g., the gNB 1) a configuration indicating that at least one of a plurality of events that trigger start of the random access is associated with the 2-step CBRA. In Step 1202, the UE 2 performs the 2-step CBRA procedure when the random access is started for any of the at least one event, or it performs the 4-step CBRA procedure when the random access is started for an event other than the at least one event.

The plurality of trigger events of the random access include, for example, as follows:
  Initial access from RRC_IDLE;
  RRC Connection Re-establishment procedure;
  Handover;
  DL or UL data arrival during RRC_CONNECTED when UL synchronisation status is "non-synchronised";
  UL data arrival during RRC_CONNECTED when there are no PUCCH resources for SR available;
  Transition from RRC INACTIVE;
  To establish time alignment at SCell addition;
  Request for Other SI; and
  Beam failure recovery.

According to the above operations, it is possible to allow the gNB 1 to control the selection by the UE 2 of the random access procedure. For example, the size of an L2/L3 message (e.g., CCCH SDU) carried by a UL MAC PDU for one trigger event is different from that for another trigger event. The larger the size of the L2/L3 message (e.g., CCCH SDU) becomes, the higher the probability that the transmission of the first message (Msg1*) of the 2-step CBRA will be failed. Accordingly, when the collision probability is high or intercell interference with a neighboring cell is strong, the gNB 1 may associate a trigger event whose size of the L2/L3 message (e.g., CCCH SDU) is larger than a threshold with the 4-step CBRA and associate a trigger event whose size of the L2/L3 message (e.g., CCCH SDU) is smaller than the threshold with the 2-step CBRA.

This embodiment may be modified as follows. The gNB 1 transmits to the UE 2 a configuration indicating that at least one of a plurality of causes of RRC establishment, RRC reestablishment, and RRC resume is associated with the 2-step random access procedure. The UE 2 performs the 2-step CBRA procedure when it starts a random access for RRC establishment, RRC reestablishment, or RRC resume based on any of the at least one cause, or it performs the 4-step CBRA procedure when it starts the random access for RRC establishment, RRC reestablishment, or RRC resume based on another cause.

This operation also allows the gNB 1 to control the selection by the UE 2 of the random access procedure.

Seventh Embodiment

Figure 13:
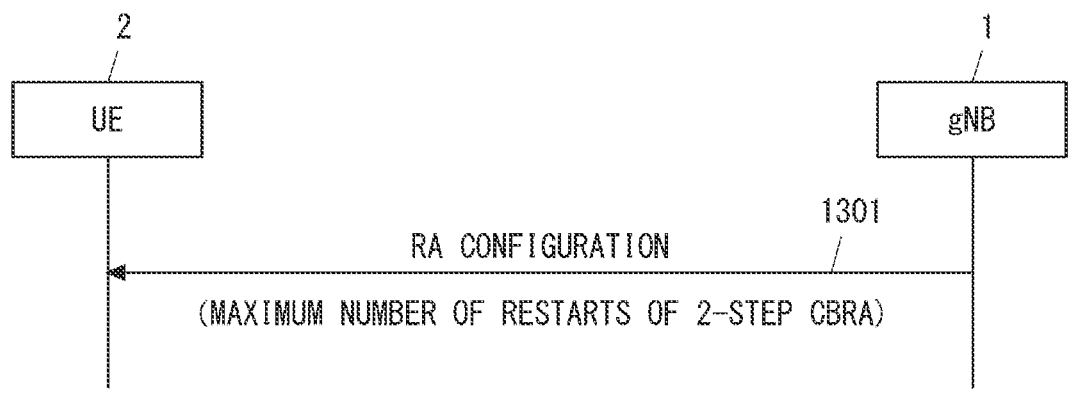
FIG. 13 is a sequence diagram showing an example of operations of a radio access network node and a radio terminal according to a seventh embodiment.

A configuration example of a radio communication network according to this embodiment is similar to the example shown in FIG. 1. FIG. 13 shows one example of operations of the gNB 1 and the UE 2 according to this embodiment. In Step 1301, the gNB 1 transmits to the UE 2 a configuration indicating the maximum number of restarts of the 2-step CBRA procedure. This configuration may be common to a plurality of UEs and may be broadcast to a plurality of UEs. This configuration may be included and transmitted in a system information block message. Alternatively, this configuration may be created per UE and supplied to the UE 2 by dedicated signalling (e.g., RRC signalling). In another alternative, this configuration may be sent from the gNB 1 to the UE 2 using the second message (Msg2*) of the 2-step CBRA.

The UE 2 may restart the random access according to the 2-step CBRA until the number of restarts of the 2-step CBRA reaches the maximum number. The UE 2 may fall back to the 4-step CBRA after the number of restarts of the 2-step CBRA reaches the maximum number. The maximum number of restarts of the 2-step CBRA procedure may be the maximum value of the PREAMBLE_TRANSMISSION_COUNTER of the 2-step CBRA described above. The gNB 1 may include, in the second message (Msg2*) of the 2-step CBRA, a notification indicating activation of this control (i.e., a fallback to the 4-step CBRA based on the maximum number of restarts of the 2-step CBRA procedure). This notification may be, for example, a flag bit or a specific MAC subheader. The UE 2 may execute this control only if the UE 2 receives (detects) this notification.

According to the above operations, it is possible to allow the gNB 1 to control the selection by the UE 2 of the random access procedure. Note that, the maximum number of starts of the 2-step CBRA procedure may be used in place of the maximum number of restarts of the 2-step CBRA procedure.

Eighth Embodiment

Figure 14:
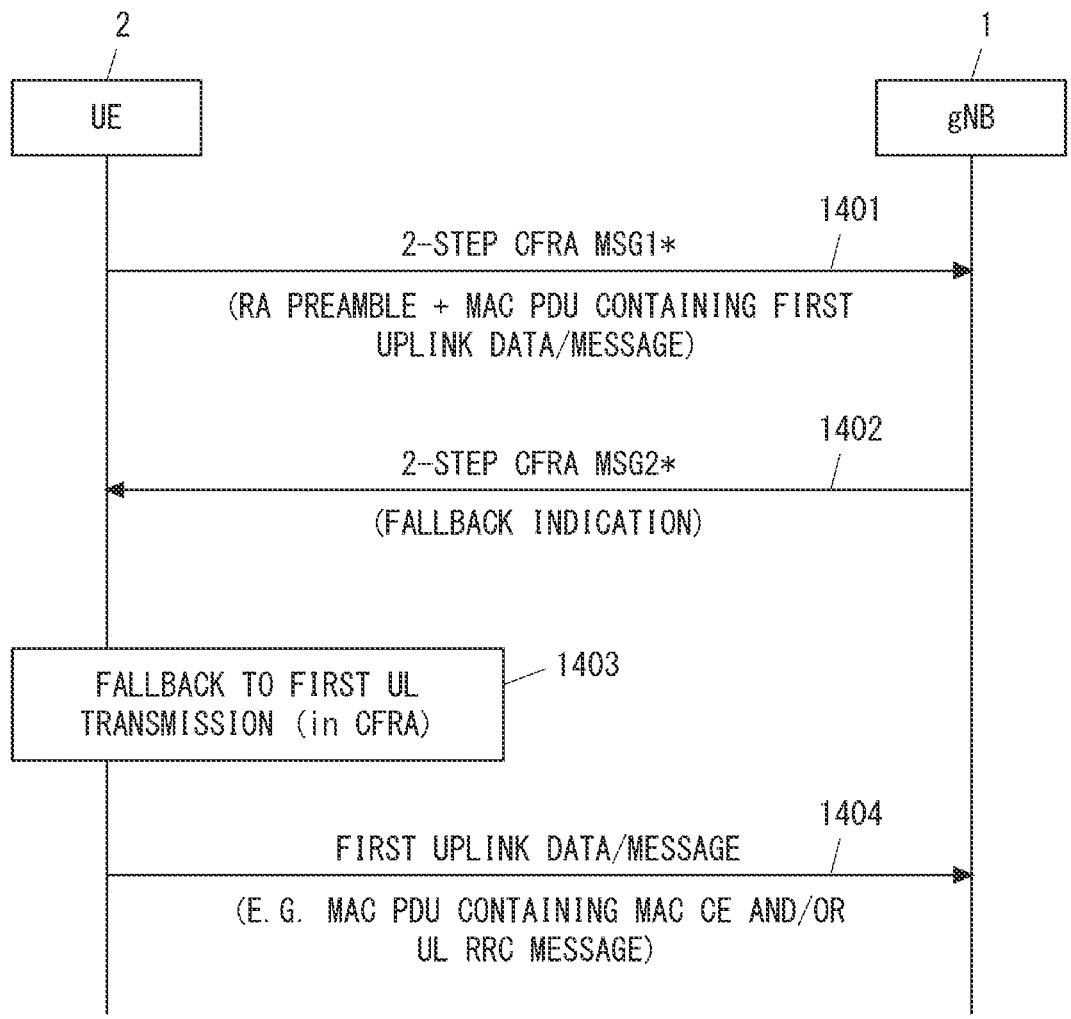
FIG. 14 is a sequence diagram showing an example of operations of a radio access network node and a radio terminal according to an eighth embodiment.

A configuration example of a radio communication network according to this embodiment is similar to the example shown in FIG. 1. FIG. 14 shows one example of a contention-free random access (CFRA) procedure according to this embodiment. More specifically, FIG. 14 shows an example of a success case that involves a fallback from a 2-step CFRA to a 3-step CFRA-based access. The 3-step CFRA-based access here includes a random access preamble (Msg1) and a random access response (RAR) of the existing 2-step CFRA, and also includes a first uplink transmission (e.g., UL data transmission, UL RRC message) after successful CFRA. On the other hand, in the 2-step CFRA according to this embodiment, a first message (Msg1*) includes both a preamble and a MAC PDU that corresponds to the first uplink data or message in the 3-step CFRA-based access, and a second message (Msg2*) includes a response to the first message (Msg1*). It is therefore possible for the 2-step CFRA according to this embodiment to reduce the delay until the first uplink transmission.

In Step 1401, the UE 2 transmits a first message (Msg1*) of the 2-step CFRA procedure. The Msg1* may carry, for example, a preamble and a MAC PDU. The preamble contained in the Msg1* may also be referred to as a random access (RA) preamble, a random access channel (RACH) preamble, or the like. The MAC PDU may contain, for example, information the same as or similar to that carried by the first uplink transmission in the conventional 3-step CFRA-based access. The MAC PDU may be, for example, uplink user data in the resume of uplink data transmission, an RRC message indicating handover completion when a handover is performed (e.g., handover confirmation or reconfiguration-with-sync completion), an RRC message indicating modification of a secondary cell group (SCG) configuration of Dual Connectivity or completion of a change of a secondary base station (e.g., SgNB) (e.g., RRC Reconfiguration Complete), or the like. Additionally or alternatively, the MAC PDU may contain another MAC-layer control information that is defined for the 2-step CBRA.

In Step 1402, the gNB 1 transmits a second message (Msg2*) of the 2-step CFRA procedure. In response to receiving the Msg1*, the gNB 1 determines whether or not the whole Msg1* has been successfully received. For example, if the preamble within the Msg1* (i.e., the information corresponding to the Msg1 in the 3-step CFRA-based access) is successfully received but the MAC PDU within the Msg1* is not received, then the gNB 1 may include a fallback notification in the second message (Msg2*) of the 2-step CFRA. The fallback notification explicitly or implicitly indicates a fallback to the 3-step CFRA-based access procedure.

The Msg2* may contain a MAC control information (or CE) that is defined as a random access response (RAR) of the 2-step CFRA and is different from an RAR of the 3-step CFRA-based access. Alternatively, the Msg2* may contain another information element (or field) that indicates a random access response (RAR) of the 2-step CFRA. The Msg2* may further contain an information element (e.g., a Timing Advance Command) regarding an uplink transmission timing associated with the successfully received preamble and contain a terminal identifier (e.g., a Temporary C-RNTI), regardless of whether the MAC PDU in the Msg1* has been received. In other words, the gNB 1 may transmit an Msg2* (i.e., downlink MAC subPDU) that contains a Timing Advance Command destined for a target (i.e., IE) to which a fallback notification is to be sent, and also transmit an Msg2* (i.e., downlink MAC subPDU) that contains another Timing Advance Command destined for anther target (i.e., UE) to which information necessary to complete the 2-step CBRA (e.g., an RRC message, or an UE Contention Resolution Identity MAC CE, or both) is sent. These two types of Msg2* may be contained in one downlink MAC PDU or in different downlink MAC PDUs transmitted in different radio resources (e.g., time or frequency). The successfully receiving the preamble within the Msg1* may be equivalent of correctly detecting this preamble or successfully decoding this preamble part. The fallback notification may be a notification indicating that only the preamble in the Msg1* has been successfully received. In the following, descriptions will be given using the term "fallback notification" (or "notification of a fallback").

Upon successfully receiving the second message (Msg2*) of the 2-step CFRA, the UE determines whether or not the Msg2* (explicitly or implicitly) indicates a fallback to the 3-step CFRA-based access procedure. In response to determining that the Msg2* indicates a fallback to the 3-step CFRA-based access procedure, the UE 2 falls back to the 3-step CFRA-based access procedure (Step 1403). Then the UE 2 starts an operation to transmit a third message (Msg3) of the 3-step CBFA-based access procedure. That is, only if the UE 2 successfully decodes (or detects) the fallback notification from the Msg2*, the UE 2 expects the fallback to the 3-step CFRA-based access procedure. In other words, the UE 2 does not need to expect or prepare the fallback to the 3-step CFRA-based access procedure unless the UE 2 has successfully decoded (or has detected) the fallback notification from the Msg2*.

In response to determining that the Msg2* in Step 1402 explicitly or implicitly indicates the fallback to the 3-step CFRA-based access, the UE 2 executes Step 1404. In Step 1404, in response to receiving the fallback notification in Step 1402, the UE 2 transmits the third message (Msg3) of the 3-step CFRA-based access procedure (i.e., the first uplink data or the message). The information (i.e., uplink grant) regarding radio resources available for transmitting the Msg3 may be specified by the MAC PDU in the Msg2* or may be specified by a PDCCH/DCI after the Msg2*. In the latter case, in response to determining that the Msg2* indicates a fallback, the UE 2 may attempt to receive the uplink grant by receiving the PDCCH/DCI.

Figure 15:
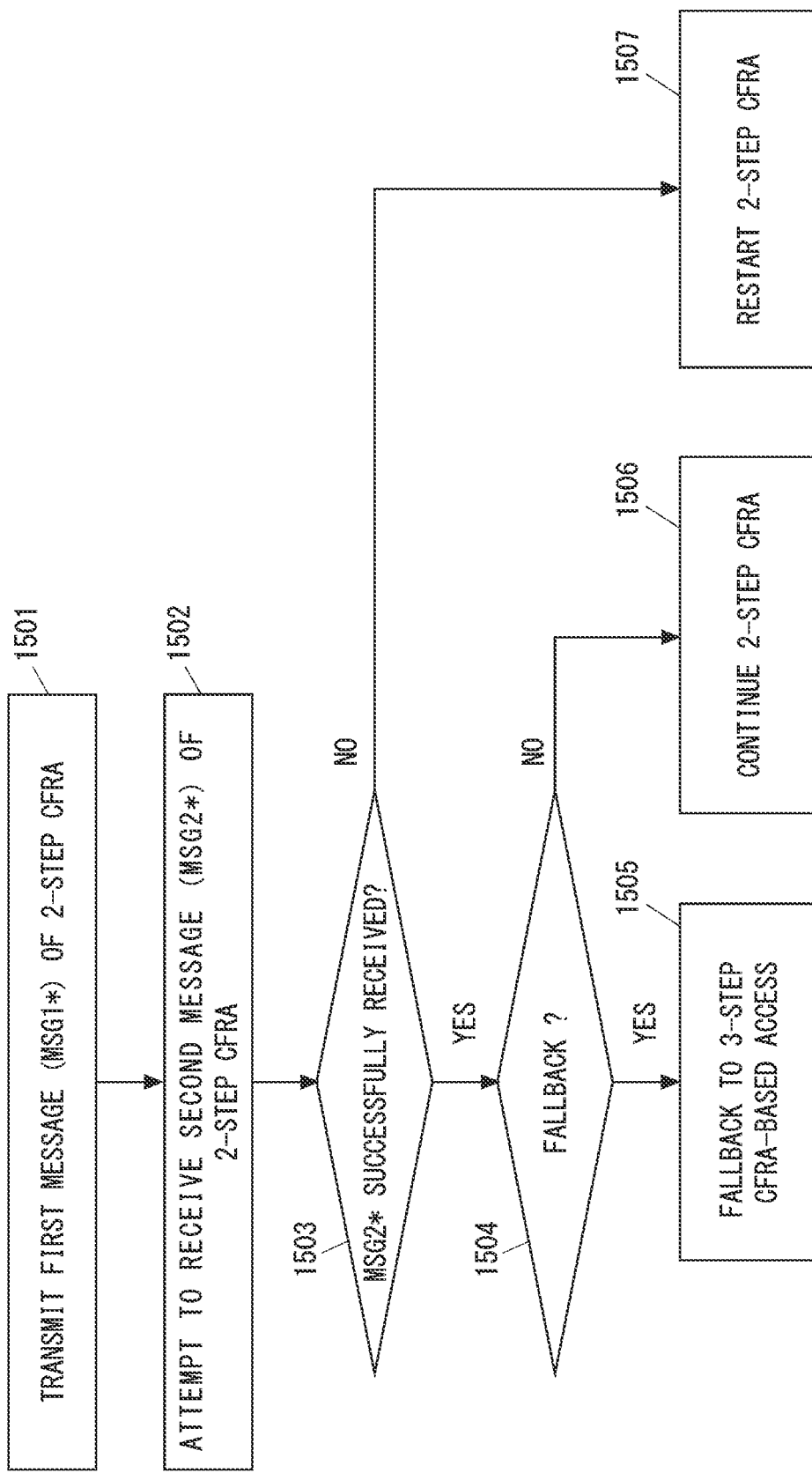
FIG. 15 is a flowchart showing an example of an operation of a radio terminal according to the eighth embodiment.

FIG. 15 is a flowchart showing one example of an operation of the UE 2 according to this embodiment. In Step 1501, the UE 2 transmits a first message (Msg1*) of the 2-step CFRA. In Step 1502, the UE 2 attempts to receive a second message (Msg2*) of the 2-step CFRA. In Step 1503, the UE 2 determines whether or not it has successfully received the second message (Msg2*). Specifically, upon receiving in the RAR window the second message that contains the preamble identifier that matches the index of the RA preamble transmitted in Step 1501, the UE 2 considers that the second message (Msg2*) has been successfully received (Step 1503). That is, in this example, the successful reception of the second message (Msg2*) means that the UE 2 has determined that the RA preamble that has been transmitted by the UE 2 itself has been successfully received (or detected). In Step 1504, the UE 2 determines whether or not the second message (Msg2*) indicates a fallback.

If the second message (Msg2*) is successfully received and the second message (Msg2*) indicates a fallback, then the UE 2 falls back to the 3-step CFRA-based access (Step 1505). Specifically, the UE 2 may perform operations of Steps 1403 and 1404 in FIG. 14.

If the second message (Msg2*) is successfully received and the second message (Msg2*) does not indicate a fallback, the UE 2 considers that the 2-step CFRA procedure has been successfully completed (Step 1506). In other words, the UE 2 considers, based on the content of the second message (Msg2*), that the RA preamble transmitted by the UE 2 itself has been successfully received (or detected) (i.e., the preamble transmission has been successfully completed) and considers that the 2-step CFRA procedure has been successfully completed if the UE 2 determines that information necessary for the 2-step CFRA procedure is contained in the Msg2*.

If the second message (Msg2*) is not successfully received, the UE 2 restarts the 2-step CFRA procedure (Step 1507).

Figure 16:
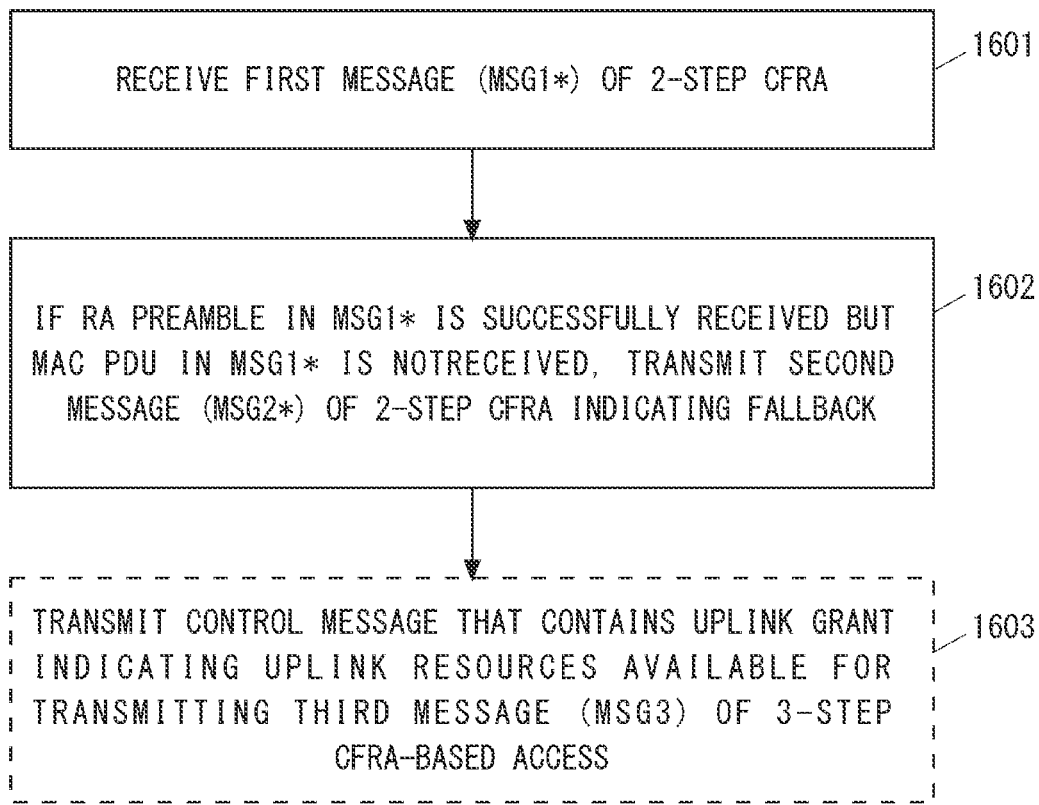
FIG. 16 is a flowchart showing an example of an operation of a radio access network node according to the eighth embodiment.

FIG. 16 is a flowchart showing one example of an operation of the gNB 1 according to this embodiment. In Step 1601, the gNB 1 receives a first message (Msg1*) of the 2-step CFRA. In Step 1602, if the RA preamble in the Msg1* is successfully received but the MAC PDU in the Msg1* (e.g., an RRC message including a UE identifier) is not successfully received, the gNB 1 transmits a second message (Msg2*) of the 2-step CBRA indicating a fallback. For example, the gNB 1 may include a fallback notification in the second message (Msg2*) of the 2-step CFRA. The second message (Msg2*) or the fallback notification requests (or causes) the UE 2 to, after successfully receiving this Msg2*, transmit a third message (Msg3) of the 3-step CFRA-based access procedure (i.e., the first uplink data or message). The information (or uplink grant) of radio resources available for transmitting the Msg3 may be specified by the MAC PDU of the Msg2* or may be specified by a PDCCH/DCI after the Msg2*. In the latter case, in Step 1603, the gNB 1 transmits a control message that contains an uplink grant indicating uplink resources available for transmitting the third message (Msg3) of the 3-step CFRA-based access. If the UE 2 receives the Msg2* and determines that it is notified of a fallback to the 3-step CFRA-based access, the UE 2 may attempt to receive the uplink grant of the Msg3 by receiving the subsequent PDCCH/DCI.

Figure 17:
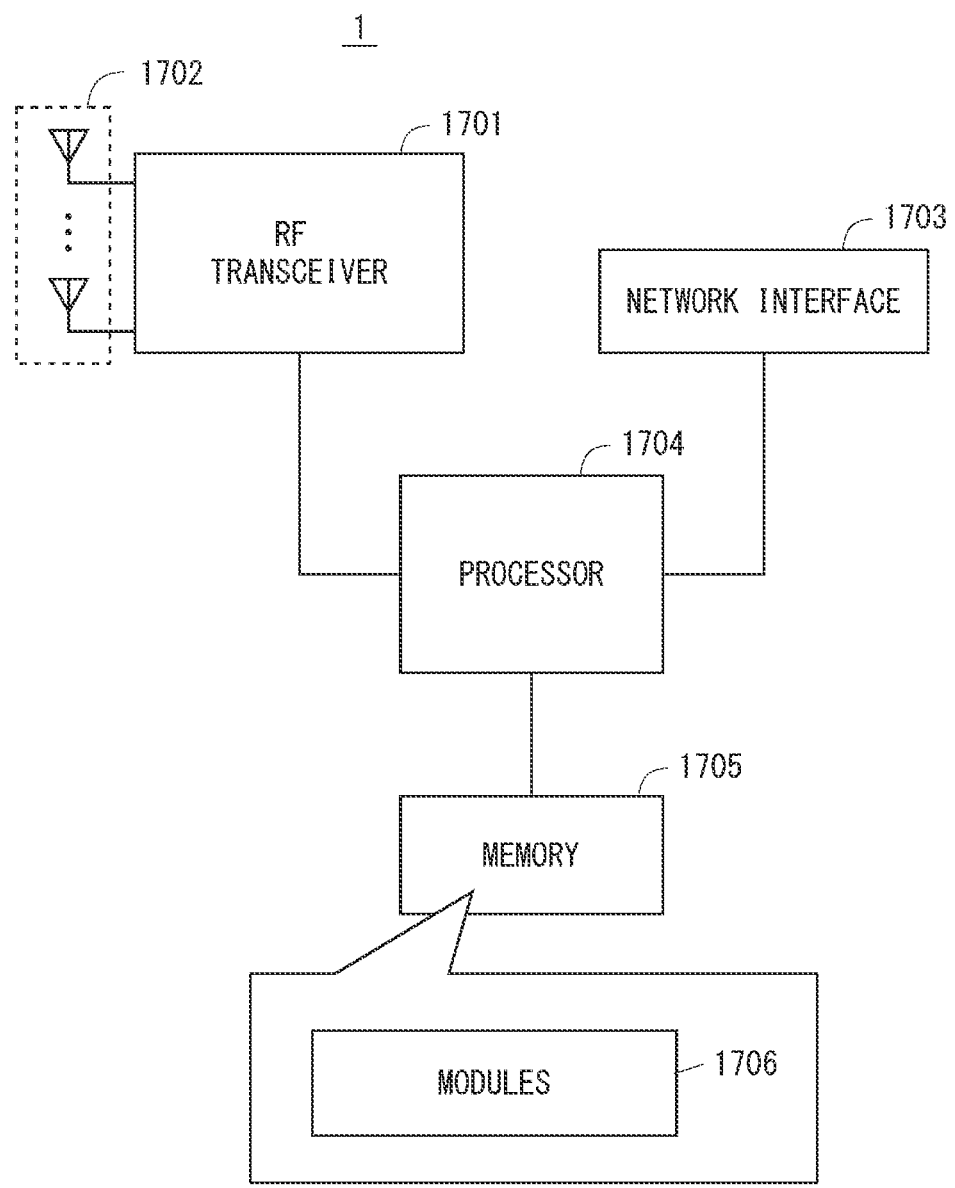
FIG. 17 is a block diagram showing a configuration example of a radio access network node according to embodiments.

The following provides configuration examples of the gNB 1 and the UE 2 according to the above-described embodiments. FIG. 17 is a block diagram showing a configuration example of the gNB 1 according to the above-described embodiments. Referring to FIG. 17, the gNB 1 includes a Radio Frequency transceiver 1701, a network interface 1703, a processor 1704, and a memory 1705. The RF transceiver 1701 performs analog RF signal processing to communicate with NG UEs including the UE 2. The RF transceiver 1701 may include a plurality of transceivers. The RF transceiver 1701 is coupled to an antenna array 1702 and the processor 1704. The RF transceiver 1701 receives modulated symbol data from the processor 1704, generates a transmission RF signal, and supplies the transmission RF signal to the antenna array 1702. Further, the RF transceiver 1701 generates a baseband reception signal based on a reception RF signal received by the antenna array 1702 and supplies the baseband reception signal to the processor 1704. The RF transceiver 1701 may include an analog beamformer circuit for beam forming. The analog beamformer circuit includes, for example, a plurality of phase shifters and a plurality of power amplifiers.

The network interface 1703 is used to communicate with network nodes (e.g., a control node and a transfer node of 5G Core). The network interface 1703 may include, for example, a network interface card (NIC) conforming to the IEEE 802.3 series.

The processor 1704 performs digital baseband signal processing (i.e., data-plane processing) and control-plane processing for radio communication. The processor 1704 may include a plurality of processors. The processor 1704 may include, for example, a modem processor (e.g., a Digital Signal Processor (DSP)) that performs digital baseband signal processing and a protocol stack processor (e.g., a Central Processing Unit (CPU) or a Micro Processing Unit (MPU)) that performs the control-plane processing. The processor 1704 may include a digital beamformer module for beam forming. The digital beamformer module may include a Multiple Input Multiple Output (MIMO) encoder and a pre-coder.

The memory 1705 is composed of a combination of a volatile memory and a non-volatile memory. The volatile memory is, for example, a Static Random Access Memory (SRAM), a Dynamic RAM (DRAM), or a combination thereof. The non-volatile memory is, for example, a mask Read Only Memory (MROM), an Electrically Erasable Programmable ROM (EEPROM), a flash memory, a hard disc drive, or any combination thereof. The memory 1705 may include a storage located apart from the processor 1704. In this case, the processor 1704 may access the memory 1705 via the network interface 1703 or an I/O interface (not shown).

The memory 1705 may store one or more software modules (computer programs) 1706 including instructions and data to perform processing by the gNB 1 described in the above embodiments. In some implementations, the processor 1704 may be configured to load the software modules 1706 from the memory 1705 and execute the loaded software modules, thereby performing processing of the gNB 1 described in the above embodiments.

When the gNB 1 is a gNB-CU, the gNB 1 does not need to include the RF transceiver 1701 (and the antenna array 1702).

Figure 18:
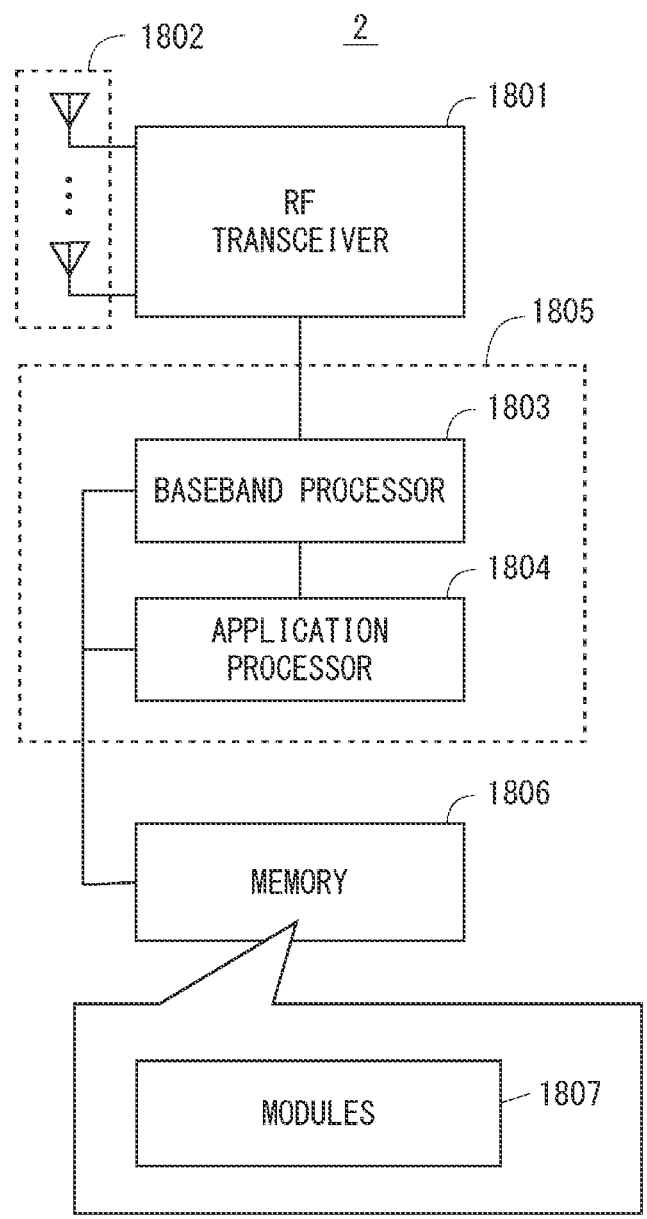
FIG. 18 is a block diagram showing a configuration example of a radio terminal according to embodiments.

FIG. 18 is a block diagram showing a configuration example of the UE 2. A Radio Frequency (RF) transceiver 1801 performs analog RF signal processing to communicate with the gNB 1. The RF transceiver 1801 may include a plurality of transceivers. The analog RF signal processing performed by the RF transceiver 1801 includes frequency up-conversion, frequency down-conversion, and amplification. The RF transceiver 1801 is coupled to an antenna array 1802 and a baseband processor 1803. The RF transceiver 1801 receives modulated symbol data (or OFDM symbol data) from the baseband processor 1803, generates a transmission RF signal, and supplies the transmission RF signal to the antenna array 1802. Further, the RF transceiver 1801 generates a baseband reception signal based on a reception RF signal received by the antenna array 1802 and supplies the baseband reception signal to the baseband processor 1803. The RF transceiver 1801 may include an analog beamformer circuit for beam forming. The analog beamformer circuit includes, for example, a plurality of phase shifters and a plurality of power amplifiers.

The baseband processor 1803 performs digital baseband signal processing (i.e., data-plane processing) and control-plane processing for radio communication. The digital baseband signal processing includes (a) data compression/decompression, (b) data segmentation/concatenation, (c) composition/decomposition of a transmission format (i.e., transmission frame), (d) channel coding/decoding, (e) modulation (i.e., symbol mapping)/demodulation, and (f) generation of OFDM symbol data (i.e., baseband OFDM signal) by Inverse Fast Fourier Transform (IFFT). Meanwhile, the control-plane processing includes communication management of layer 1 (e.g., transmission power control), layer 2 (e.g., radio resource management and hybrid automatic repeat request (HARQ) processing), and layer 3 (e.g., signaling regarding attach, mobility, and call management).

The digital baseband signal processing by the baseband processor 1803 may include, for example, signal processing of a Service Data Adaptation Protocol (SDAP) layer, a Packet Data Convergence Protocol (PDCP) layer, a Radio Link Control (RLC) layer, a MAC layer, and a PHY layer. Further, the control-plane processing performed by the baseband processor 1803 may include processing of a Non-Access Stratum (NAS) protocol, an RRC protocol, and MAC CEs.

The baseband processor 1803 may perform MIMO encoding and pre-coding for beam forming.

The baseband processor 1803 may include a modem processor (e.g., DSP) that performs the digital baseband signal processing and a protocol stack processor (e.g., a CPU or an MPU) that performs the control-plane processing. In this case, the protocol stack processor, which performs the control-plane processing, may be integrated with an application processor 1804 described in the following.

The application processor 1804 is also referred to as a CPU, an MPU, a microprocessor, or a processor core. The application processor 1804 may include a plurality of processors (processor cores). The application processor 1804 loads a system software program (Operating System (OS)) and various application programs (e.g., a call application, a WEB browser, a mailer, a camera operation application, and a music player application) from a memory 1806 or from another memory (not shown) and executes these programs, thereby providing various functions of the UE 2.

In some implementations, as represented by a dashed line (1805) in FIG. 18, the baseband processor 1803 and the application processor 1804 may be integrated on a single chip. In other words, the baseband processor 1803 and the application processor 1804 may be implemented in a single System on Chip (SoC) device 1805. An SoC device may be referred to as a Large Scale Integration (LSI) or a chipset.

The memory 1806 is a volatile memory, a non-volatile memory, or a combination thereof. The memory 1806 may include a plurality of memory devices that are physically independent from each other. The volatile memory is, for example, an SRAM, a DRAM, or a combination thereof. The non-volatile memory is, for example, an MROM, an EEPROM, a flash memory, a hard disc drive, or any combination thereof. The memory 1806 may include, for example, an external memory device that can be accessed from the baseband processor 1803, the application processor 1804, and the SoC 1805. The memory 1806 may include an internal memory device that is integrated in the baseband processor 1803, the application processor 1804, or the SoC 1805. Further, the memory 1806 may include a memory in a Universal Integrated Circuit Card (UICC).

The memory 1806 may store one or more software modules (computer programs) 1807 including instructions and data to perform the processing by the UE 2 described in the above embodiments. In some implementations, the baseband processor 1803 or the application processor 1804 may load these software modules 1807 from the memory 1806 and execute the loaded software modules, thereby performing the processing of the UE 2 described in the above embodiments with reference to the drawings.

The control-plane processing and operations performed by the UE 2 described in the above embodiments can be achieved by elements other than the RF transceiver 1801 and the antenna array 1802, i.e., achieved by the memory 1806, which stores the software module 1807, and one or both of the baseband processor 1803 and the application processor 1804.

As described above with reference to FIGS. 17 and 18, each of the processors that the gNB 1 and UE 2 according to the above embodiments include executes one or more programs including instructions for causing a computer to execute an algorithm described with reference to the drawings. This program can be stored and provided to a computer using any type of non-transitory computer readable media. Non-transitory computer readable media include any type of tangible storage media. Examples of non-transitory computer readable media include magnetic storage media (such as flexible disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

OTHER EMBODIMENTS

Each of the above-described embodiments may be used individually or two or more embodiments may be appropriately combined with one another. For example, the second to sixth embodiments do not necessarily need details of the fallback operation described in the first embodiment. In other words, the second to sixth embodiments may be executed independently from the first embodiment. Further, the second to sixth embodiments may be executed independently, contribute to solving objects or problems different from one another, and achieving different effects.

The explanations of the embodiments have been mainly provided with regard to the 5G system. The 5G system is a beam-based system and a number of beams are used in one cell. When, for example, a synchronization signal (SS)/physical broadcast channel (PBCH) block (SSB) is transmitted on a plurality of beams (e.g., eight beams), the UE 2 selects one from a pool of preambles of the random access associated with (the beam of) the SSB detected most strongly. The UE 2 further receives a random access response transmitted from the gNB using downlink beams associated with the (uplink) beams on which the preamble has been transmitted or downlink beams that correspond to the beams of the SSB detected most strongly. In the above-described embodiments, the 2-step CBRA (or CFRA) and the 4-step CBRA (or the 3-step CFRA-based access) may use different beams (beam sets).

The above-described embodiments may be applied also to a case in which the first message (Msg1*) of the 2-step CBRA and CFRA includes a signal or information other than the preamble. The signal or information used in place of the preamble may be, for example, a reference signal (e.g., Demodulation RS (DM-RS)) for demodulating information (e.g., MAC PDU) contained in the Msg1*. In the case of a CBRA, the UE 2 selects one of a plurality of candidates of the reference signal (sequence) randomly or in accordance with a predetermined criterion and transmits the selected candidate in the Msg1*. The gNB 1 may determine that a fallback should be performed when a reference signal whose reception level is high (e.g., an autocorrelation value is equal to or larger than a predetermined threshold) has been detected from among the reference signals contained in the Msg1* but information on the Msg1* (e.g., MAC PDU) has not been successfully received using the reference signal. When the fallback is performed, an identifier (e.g., an RS index) of the reference signal may be used in place of the index of the preamble in the above-described embodiments.

The above-described embodiments may be applied to a random access in one or both of a Master Cell Group (MCG) and a Secondary Cell Group (SCG) in Dual Connectivity. Dual Connectivity here may be EUTRA-NR DC (EN-DC) between an LTE eNB and an NR gNB. Alternatively, Dual Connectivity may be Dual Connectivity (NR-DC) between two gNBs that are connected to the 5GC or may be Multi-RAT Dual Connectivity (MR-DC) between NG-RAN nodes of different RATs. The NR-DC and the above MR-DC may be collectively defined as Multi-Radio Dual Connectivity (MR-DC).

The above-described embodiments may be applied to cellular communications in a licensed spectrum and may also be applied to cellular communications in an unlicensed spectrum (e.g., LTE-Unlicensed (LTE-U) and NR-Unlicensed (NR-U)). This may be a Licensed Assisted Access (LAA) in which communication is performed in an unlicensed spectrum in collaboration with communication in the licensed spectrum, and Standalone (SA) in which communication is performed in an unlicensed spectrum alone. Further, operations in the SA in the unlicensed spectrum are not limited to cellular communications.

The User Equipment (UE) in the present disclosure is an entity connected to a network via a wireless interface. It should be noted that the UE in the present disclosure is not limited to a dedicated communication device, and can be any device as follows having a communication function herein explained.

The terms "User Equipment (UE)" (as the term is used by 3GPP), "mobile station", "mobile terminal", "mobile device", and "radio terminal (wireless device)" are generally intended to be synonymous with one another. The UE may include standalone mobile stations, such as terminals, cell phones, smartphones, tablets, cellular IoT (internet of things) terminals, and IoT devices. It will be appreciated that the terms "UE" and "radio terminal" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper projecting machinery; chemical machinery; mining and/or construction machinery and/or related equipment; machinery and/or implements for agriculture, forestry and/or fisheries; safety and/or environment preservation equipment; tractors; power transmission equipment; and/or application systems for any of the previously mentioned equipment or machinery etc.).

A UE may, for example, be an item of transport equipment (for example transport equipment such as: rolling stocks; motor vehicles; motorcycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be an item of trade and/or service industry equipment, a vending machine, an automatic service machine, an office machine or equipment, a consumer electronic and electronic appliance (for example a consumer electronic appliance such as: audio equipment; a speaker; a radio; video equipment; a television etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies. Internet of Things devices (or "things") may be equipped with appropriate electronics, software, sensors, network connectivity, and/or the like, which enable these devices to collect and exchange data with each other and with other communication devices. IoT devices may comprise automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked. It will be appreciated that IoT technology can be implemented on any communication devices that can connect to a communications network for sending/receiving data, regardless of whether such communication devices are controlled by human input or software instructions stored in memory. It will be appreciated that IoT devices are sometimes also referred to as Machine-Type Communication (MTC) devices, Machine-to-Machine (M2M) communication devices, or Narrow Band-IoT (NB-IoT) UE.

It will be appreciated that a UE may support one or more IoT or MTC applications.

Some examples of MTC applications are listed in 3GPP TS 22.368 V13.2.0 (2017 Jan. 13), Annex B (the contents of which are incorporated herein by reference). This list is not exhaustive and is intended to be indicative of some examples of MTC applications. In this list, the Service Area of the MTC applications includes Security, Tracking & Tracing, Payment, Health, Remote Maintenance/Control, Metering, and Consumer Devices.

Examples of the MTC applications regarding Security include Surveillance systems, Backup for landline, Control of physical access (e.g., to buildings), and Car/driver security.

Examples of the MTC applications regarding Tacking & Tracing include Fleet Management, Order Management, Telematics insurance: Pay as you drive (PAYD), Asset Tracking, Navigation, Traffic information, Road tolling, and Road traffic optimisation/steering.

Examples of the MTC applications regarding Payment include Point of sales (POS), Vending machines, and Gaming machines.

Examples of the MTC applications regarding Health include Monitoring vital signs, Supporting the aged or handicapped, Web Access Telemedicine points, and Remote diagnostics.

Examples of the MTC applications regarding Remote Maintenance/Control include Sensors, Lighting, Pumps, Valves, Elevator control, Vending machine control, and Vehicle diagnostics.

Examples of the MTC applications regarding Metering include Power, Gas, Water, Heating, Grid control, and Industrial metering.

Examples of the MTC applications regarding Consumer Devices include Digital photo frame, Digital camera, and eBook.

Applications, services, and solutions may be an Mobile Virtual Network Operator (MVNO) service/system, an emergency radio communication service/system, a Private Branch eXchange (PBX) service/system, a PHS/Digital Cordless Telecommunications service/system, a Point of sale (POS) service/system, an advertise calling service/system, a Multimedia Broadcast and Multicast Service (MBMS) service/system, a Vehicle to Everything (V2X) service/system, a train radio service/system, a location related service/system, a Disaster/Emergency Wireless Communication Service/system, an Internet of Things (IoT) service/system, a community service/system, a video streaming service/system, a femto cell application service/system, a Voice over LTE (VoLTE) service/system, a radio tag service/system, a charging service/system, a radio on demand service/system, a roaming service/system, an activity monitoring service/system, a telecom carrier/communication NW selection service/system, a functional restriction service/system, a Proof of Concept (PoC) service/system, a personal information management service/system, a display video service/system, a non-communication service/system, an ad-hoc network/Delay Tolerant Networking (DTN) service/system, etc.

Further, the above-described UE categories are merely examples of applications of the technical ideas and embodiments described in the present disclosure. The UE described in this disclosure is not limited to these examples and various modifications can be made thereto by those skilled in the art.

The above-described embodiments are merely examples of applications of the technical ideas obtained by the inventor. These technical ideas are not limited to the above-described embodiments and various modifications can be made thereto.

The whole or part of the exemplary embodiments disclosed above can be described as, but not limited to, the following supplementary notes.

(Supplementary Note 1)

A radio terminal comprising:
at least one memory; and
at least one processor coupled to the at least one memory and configured to, in response to receiving system information indicating activation of a fallback from a 2-step random access procedure to a 4-step random access procedure from a network, concurrently attempt both to receive a second message of the 2-step random access procedure and to receive a second message of the 4-step random access procedure after transmitting a first message of the 2-step random access procedure.

(Supplementary Note 2)

The radio terminal according to Supplementary Note 1, wherein
the attempt to receive the second message of the 2-step random access procedure comprises attempting to receive the second message of the 2-step random access procedure in a first time window associated with the 2-step random access procedure, and
the attempt to receive the second message of the 4-step random access procedure comprises attempting to receive the second message of the 2-step random access procedure in a second time window associated with the 4-step random access procedure.

(Supplementary Note 3)

The radio terminal according to Supplementary Note 2, wherein
the attempt to receive the second message of the 2-step random access procedure comprises monitoring a Physical Downlink Control Channel (PDCCH) in the first time window using a first RA-RNTI associated with the 2-step random access procedure, in order to decode downlink control information indicating downlink resources in which the second message of the 2-step random access procedure is scheduled, and the attempt to receive the second message of the 4-step random access procedure comprises monitoring the PDCCH in the second time window using a second RA-RNTI associated with the 4-step random access procedure, in order to decode downlink control information indicating downlink resources in which the second message of the 4-step random access procedure is scheduled.

(Supplementary Note 4)
A radio terminal comprising:
at least one memory; and
at least one processor coupled to the at least one memory and configured to provide a Radio Resource Control (RRC) layer and a Medium Access Control (MAC) layer,
wherein the MAC layer is configured to, when performing a fallback from a 2-step random access procedure to a 4-step random access procedure, notify the RRC layer of the fallback.

(Supplementary Note 5)
A radio terminal comprising:
at least one memory; and
at least one processor coupled to the at least one memory and configured to provide a Radio Resource Control (RRC) layer and a Medium Access Control (MAC) layer,
wherein the MAC layer is configured to notify the RRC layer of a change from a 2-step random access procedure to a 4-step random access procedure and vice versa.

(Supplementary Note 6)
A radio terminal comprising:
at least one memory; and
at least one processor coupled to the at least one memory and configured to, if a random access is not successfully completed although a fallback from a 2-step random access procedure to a 4-step random access procedure has been performed, select between the 2-step random access procedure and the 4-step random access procedure to restart the random access.

(Supplementary Note 7)
The radio terminal according to Supplementary Note 6, wherein the at least one processor is configured to restart the random access according to one of the 2-step random access procedure and the 4-step random access procedure, in which a next available preamble transmission opportunity comes earlier than in the other.

(Supplementary Note 8)
The radio terminal according to Supplementary Note 6, wherein the at least one processor is configured to restart the random access according to one of the 2-step random access procedure and the 4-step random access procedure, in which a cycle or interval between available preamble transmission opportunities is shorter than in the other.

(Supplementary Note 9)
The radio terminal according to Supplementary Note 6, wherein the at least one processor is configured to select between the 2-step random access procedure and the 4-step random access procedure based on a number of attempts of the 2-step random access procedure and a number of attempts of the 4-step random access procedure.

(Supplementary Note 10)
A radio terminal comprising:
at least one memory; and
at least one processor coupled to the at least one memory and configured to:
receive from a network a configuration indicating that at least one of a plurality of events that trigger start of a random access is associated with a 2-step random access procedure;
perform the 2-step random access procedure if the random access is started for any of the at least one event; and
perform a 4-step random access procedure if the random access is started for an event other than the at least one event.

(Supplementary Note 11)
A radio terminal comprising:
at least one memory; and
at least one processor coupled to the at least one memory and configured to:
receive from a network a configuration indicating that at least one of a plurality of causes regarding Radio Resource Control (RRC) establishment, RRC reestablishment, and RRC resume is associated with a 2-step random access procedure;
perform the 2-step random access procedure if a random access is started for RRC establishment, RRC reestablishment, or RRC resume based on any of the at least one cause; and
perform a 4-step random access procedure if the random access is started for RRC establishment, RRC reestablishment, or RRC resume based on a cause other than the at least one cause.

(Supplementary Note 12)
A radio terminal comprising:
at least one memory; and
at least one processor coupled to the at least one memory and configured to:
receive from a network a configuration indicating a maximum number of restarts of a 2-step random access procedure; and
fallback to a 4-step random access procedure after a number of restarts of the 2-step random access procedure reaches the maximum number.

(Supplementary Note 13)
A RAN node comprising:
at least one memory; and
at least one processor coupled to the at least one memory and configured to transmit system information indicating activation of a fallback from a 2-step random access procedure to a 4-step random access procedure,
wherein the system information causes a radio terminal to, after transmitting a first message of the 2-step random access procedure, concurrently attempt both to receive a second message of the 2-step random access procedure and to receive a second message of the 4-step random access procedure.

(Supplementary Note 14)
The RAN node according to Supplementary Note 13, wherein
the attempt to receive the second message of the 2-step random access procedure comprises attempting to receive the second message of the 2-step random access procedure in a first time window associated with the 2-step random access procedure, and
the attempt to receive the second message of the 4-step random access procedure comprises attempting to receive the second message of the 2-step random access procedure in a second time window associated with the 4-step random access procedure.

(Supplementary Note 15)

The RAN node according to Supplementary Note 14, wherein the attempt to receive the second message of the 2-step random access procedure comprises monitoring a Physical Downlink Control Channel (PDCCH) in the first time window using a first RA-RNTI associated with the 2-step random access procedure, in order to decode downlink control information indicating downlink resources in which the second message of the 2-step random access procedure is scheduled, and the attempt to receive the second message of the 4-step random access procedure comprises monitoring the PDCCH in the second time window using a second RA-RNTI associated with the 4-step random access procedure, in order to decode downlink control information indicating downlink resources in which the second message of the 4-step random access procedure is scheduled.

This application is based upon and claims the benefit of priority from Japanese Patent Application No. 2018-202276, filed on Oct. 26, 2018, the disclosure of which is incorporated herein in its entirety by reference.

REFERENCE SIGNS LIST 1 gNB
2 UE
101 AIR INTERFACE
1704 PROCESSOR
1705 MEMORY
1803 BASEBAND PROCESSOR
1804 APPLICATION PROCESSOR
1806 MEMORY

What is claimed is:

1. A method performed by a User Equipment (UE), the method comprising:
transmitting a first message of a 2-step Contention Based Random Access (CBRA) to a communication apparatus;
receiving a second message of the 2-step CBRA from the communication apparatus,
wherein the second message includes:
a Medium Access Control (MAC) subheader associated with a fallback, and
an uplink grant indicating an uplink resource to be used for transmission of a third message of a 4-step CBRA; and
transmitting, to the communication apparatus, the third message of the 4-step CRBA in accordance with the uplink grant in a case where the UE receives the second message.

2. The method according to claim 1, further comprising:
in a case where a preamble identifier included in a Random Access Preamble Identifier (RAPID) field of the second message of the 2-step CBRA matches an index of a preamble transmitted in the first message of the 2-step CBRA, considering that the second message of the 2-step CBRA has been successfully received.

3. The method according to claim 1, further comprising:
in a case where a window regarding a random access response expires and a preamble identifier included in a Random Access Preamble Identifier (RAPID) field of the second message of the 2-step CBRA does not match an index of a preamble transmitted in the first message of the 2-step CBRA,
performing the 2-step CBRA.

4. The method according to claim 1, further comprising:
receiving a Physical Downlink Control Channel (PDCCH) addressed to a Temporary Cell Radio Network Temporary Identifier (C-RNTI) in the second message;
considering that contention resolution is unsuccessful in a case where a Medium Access Control Protocol Data Unit (MAC PDU) of a fourth message of the 4-step CBRA has been successfully decoded by a UE Contention Resolution Identity MAC Control Element (CE) included in the MAC PDU of the fourth message does not match a Common Control Channel Service Data Unit (CCCH SDU) transmitted in the third message of the 4-step CBRA; and
selecting which one of the 2-step CBRA and the 4-step CBRA is used to restart a random access, based on a count value of a PREAMBLE_TRANSMISSION_COUNTER that is used to count a number of preamble transmissions of the 2-step CBRA.

5. The method according to claim 4, further comprising receiving a maximum value of the PREAMBLE_TRANSMISSION_COUNTER from the communication apparatus via a Radio Resource Control (RRC) message.

6. The method according to claim 1, further comprising:
wherein the transmitting the first message of the 2-step CBRA to the communication apparatus includes transmitting the first message of the 2-step SBRA to the communication apparatus in a cell of the communication apparatus; and
wherein the receiving the second message of the 2-step CBRA from the communication apparatus includes receiving the second message of the 2-step CBRA from the communication apparatus in the cell,
receiving, from the communication apparatus, information indicating a maximum number of preamble transmissions of the 2-step CBRA; and
falling back to the 4-step CBRA in the cell after a number of preamble transmissions of the 2-step CBRA reaches the maximum number of preamble transmissions of the 2-step CBRA.

7. The method according to claim 1, wherein the MAC subheader is a MAC subheader indicating the fallback from the 2-step CBRA to the 4-step CBRA.

8. The method according to claim 1, wherein the third message is a message3 (msg3) in the 4-step CBRA.

9. The method according to claim 1, wherein the communication apparatus is a Next Generation Radio Access Network (NG-RAN) node of a gNB.

10. A User Equipment (UE) comprising:
at least one memory; and
at least one processor coupled to the at least one memory and configured to:
transmit a first message of a 2-step Contention Based Random Access (CBRA) to a communication apparatus;
receive a second message of the 2-step CBRA from the communication apparatus,
wherein the second message includes:
a Medium Access Control (MAC) subheader associated with a fallback, and
an uplink grant indicating an uplink resource to be used for transmission of a third message of a 4-step CBRA; and transmit, to the communication apparatus, the third message of the 4-step CBRA in accordance with the uplink grant in a case where the UE receives the second message.

11. The UE according to claim 10, wherein the at least one processor is further configured to,
in a case where a preamble identifier included in a Random Access Preamble Identifier (RAPIC) field of the second message of the 2-step CBRA matches an index of the preamble transmitted in the first message of the 2-step CBRA, consider that the second message of the 2-step CBRA has been successfully received.

12. The UE according to claim 10, wherein the at least one processor is further configured to:
in a case where a window regarding a random access response expires and a preamble identifier included in a Random Access Preamble Identifier (RAPID) field of the second message of the 2-step CBRA does not match an index of a preamble transmitted in the first message of the 2-step CBRA, perform transmission of the first message of the 2-step CBRA.

13. The UE according to claim 10, wherein the at least one processor is further configured to:
receive a Physical Downlink Control Channel (PDCCH) addressed to a Temporary Cell Radio Network Temporary Identifier (C-RNTI) in the second message;
consider that contention resolution is unsuccessful in a case where a Medium Access Control Protocol Data Unit (MAC PDU) of a fourth message of the 4-step CBRA has been successfully decoded but a UE Contention Resolution Identity MAC Control Element (CE) included in the MAC PDU of the fourth message does not match a Common Control Channel Service Data Unit (CCCH SDU) transmitted in the third message of the 4-step CBRA; and
select which of the 2-step CBRA and the 4-step CBRA is used to restart a random access, based on a count value of a PREAMBLE_TRANSMISSION_COUNTER that is used to count a number of preamble transmissions of the 2-step CBRA.

14. The UE according to claim 13, wherein the at least one processor is further configured to receive a maximum value of the PREAMBLE_TRANSMISSION_COUNTER from the communication apparatus via a Radio Resource Control (RRC) message.

15. A method performed by a communication apparatus, the method comprising:
receiving a first message of a 2-step Contention Based Random Access (CBRA) from a User Equipment (UE);
transmitting a second message of the 2-step CBRA to the UE,
wherein the second message includes:
a Medium Access Control (MAC) subheader associated with a fallback, and
an uplink grant indicating an uplink resource to be used for transmission of a third message of a 4-step CBRA; and receiving, from the UE, the third message of the 4-step CBRA transmitted in accordance with the uplink granting a case where the second message is transmitted.

16. The method according to claim 15, further comprising notifying, via a Radio Resource Control (RRC) message, the UE of a maximum value of a PREAMBLE_TRANSMISSION_COUNTER that is used to count a number of preamble transmissions of the 2-step CBRA.

17. The method according to claim 15, further comprising:
wherein the receiving the first message of the 2-step CBRA from the UE includes receiving the first message of the 2-step SBRA from the UE in a cell of the communication apparatus; and
wherein the transmitting the second message of the 2-step CBRA to the UE includes transmitting the second message of the 2-step CBRA to the UE in the cell,
transmitting, to the UE, information indicating a maximum number of preamble transmissions of the 2-step CBRA,
wherein the information is used for falling back to the 4-step CBRA in the cell after a number of preamble transmissions of the 2-step CBRA reaches the maximum number of preamble transmissions of the 2-step CBRA.

18. The method according to claim 15, wherein the MAC subheader is a MAC subheader indicating the fallback from the 2-step CBRA to the 4-step CBRA.

19. The method according to claim 15, wherein the third message is a message3 (msg3) in the 4-step CBRA.

20. The method according to claim 15, wherein the communication apparatus is a Next Generation Radio Access Network (NG-RAN) node of a gNB.

21. A communication apparatus comprising:
at least one memory; and
at least one processor coupled to the at least one memory and configured to:
receive a first message of a 2-step Contention Based Random Access (CBRA) from User Equipment (UE);
transmit a second message of the 2-step CBRA to the UE,
wherein the second message includes:
a Medium Access Control (MAC) subheader associated with a fallback, and
an uplink grant indicating an uplink resource to be used for transmission of a third message of a 4-step CBRA; and
receive, from the UE, the third message of the 4-step CBRA transmitted in accordance with the uplink grant in a case where the second message is transmitted.

22. The communication apparatus according to claim 21, wherein the at least one processor is further configured to notify, via a Radio Resource Control (RRC) message, the UE of a maximum value of a PREAMBLE_TRTANSMISSION_COUNTER that is used to count a number of preamble transmissions of the 2-step CBRA.

* * * * *